US012693272B2

(12) United States Patent
Langenberg et al.

(10) Patent No.: US 12,693,272 B2
(45) Date of Patent: Jul. 28, 2026

(54) DOOR FAULT IDENTIFICATION

(71) Applicant: Schlage Lock Company LLC, Carmel, IN (US)

(72) Inventors: Daniel Langenberg, Zionsville, IN (US); Nathanael L. Thomas, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 183 days.

(21) Appl. No.: 18/106,669

(22) Filed: Feb. 7, 2023

(65) Prior Publication Data

US 2023/0258611 A1 Aug. 17, 2023

Related U.S. Application Data

(63) Continuation of application No. 15/824,085, filed on Nov. 28, 2017, now abandoned.

(51) Int. Cl.

| | |
|---|---|
| ***G01N 29/44*** | (2006.01) |
| ***G01C 19/5776*** | (2012.01) |
| ***G01N 29/14*** | (2006.01) |
| ***G01P 13/00*** | (2006.01) |
| ***G01P 15/08*** | (2006.01) |
| ***G06N 3/08*** | (2023.01) |

(52) U.S. Cl.
CPC ..... *G01N 29/4454* (2013.01); *G01C 19/5776* (2013.01); *G01N 29/14* (2013.01); *G01N 29/4481* (2013.01); *G01P 13/00* (2013.01); *G01P 15/0802* (2013.01); *G06N 3/08* (2013.01); *G01N 2291/0258* (2013.01)

(58) Field of Classification Search
CPC ............... G01N 29/4454; G01N 29/14; G01N 29/4481; G01N 2291/0258; G01C 19/5776; G01P 13/00; G01P 15/0802; G06N 3/08; G05B 23/0205
See application file for complete search history.

(56) References Cited

U.S. PATENT DOCUMENTS

| | | | |
|---|---|---|---|
| 4,898,263 | A | 2/1990 | Manske et al. |
| 5,817,993 | A | 10/1998 | Kamani et al. |
| 5,828,302 | A | 10/1998 | Tsutsumi et al. |
| 8,436,731 | B2 | 5/2013 | Davis |
| 2009/0113049 | A1 | 4/2009 | Nasle et al. |
| 2011/0016971 | A1 | 1/2011 | Yulkowski et al. |

(Continued)

OTHER PUBLICATIONS

International Search Report; International Searching Authority; International Patent Application No. PCT/ US2018/062839; Feb. 14, 2019; 2 pages.

(Continued)

*Primary Examiner* — Stephen D Meier
*Assistant Examiner* — Leo T Hinze
(74) *Attorney, Agent, or Firm* — Taft Stettinius & Hollister LLP

(57) ABSTRACT

A method according to one embodiment includes receiving sensor data from a plurality of sensors of a door device associated with a door, analyzing the sensor data to determine behavior data indicative of a behavior of the door device, and comparing the behavior data to a plurality of representative data associated with a plurality of door faults to determine a corresponding likelihood that the sensor data corresponds with each of the door faults.

23 Claims, 15 Drawing Sheets

(56) References Cited

U.S. PATENT DOCUMENTS

| | | | |
|---|---|---|---|
| 2015/0253784 A1 | 9/2015 | Tehranchi et al. | |
| 2015/0330140 A1 | 11/2015 | Kincaid et al. | |
| 2016/0187368 A1* | 6/2016 | Modi | G01P 21/00<br>702/141 |
| 2017/0198496 A1 | 7/2017 | Beck | |
| 2017/0307651 A1 | 10/2017 | Ten Kate | |
| 2018/0172722 A1 | 6/2018 | He et al. | |

OTHER PUBLICATIONS

Written Opinion; International Searching Authority; International Patent Application No. PCT/US2018/062839; Feb. 14, 2019; 8 pages.

SensorTag Kit, provided: http://www.ti.com/ww/en/wireless_connectivity/sensortag/tearDown.html, printed Nov. 28, 2017, pp. 1-16.

* cited by examiner

500

502
MONITOR FOR EXTERNAL FORCES ACTING ON DOOR

504
FORCE DETECTED?
NO
YES

506
WAKE UP SENSORS

508
RECORD SENSOR DATA

510
PERFORM BASIC FILTERING AND/OR CALIBRATION OF SENSOR DATA

512
DOOR STOPPED?
NO
YES

514
ANALYZE SENSOR DATA TO DETERMINE INERTIAL MEASUREMENT(S) OF DOOR'S BEHAVIOR

516
DETERMINE ENVIRONMENTAL CONTEXT BASED ON SENSOR DATA FROM ENVIRONMENTAL SENSOR(S)

518
DETERMINE BEHAVIOR DATA AND/OR LIKELIHOOD OF FAULTS BASED ON SENSOR DATA AND FAULT DATA

520
STORE AND/OR TRANSMIT DATA

522
EVALUATE HISTORICAL BEHAVIOR OF DOOR

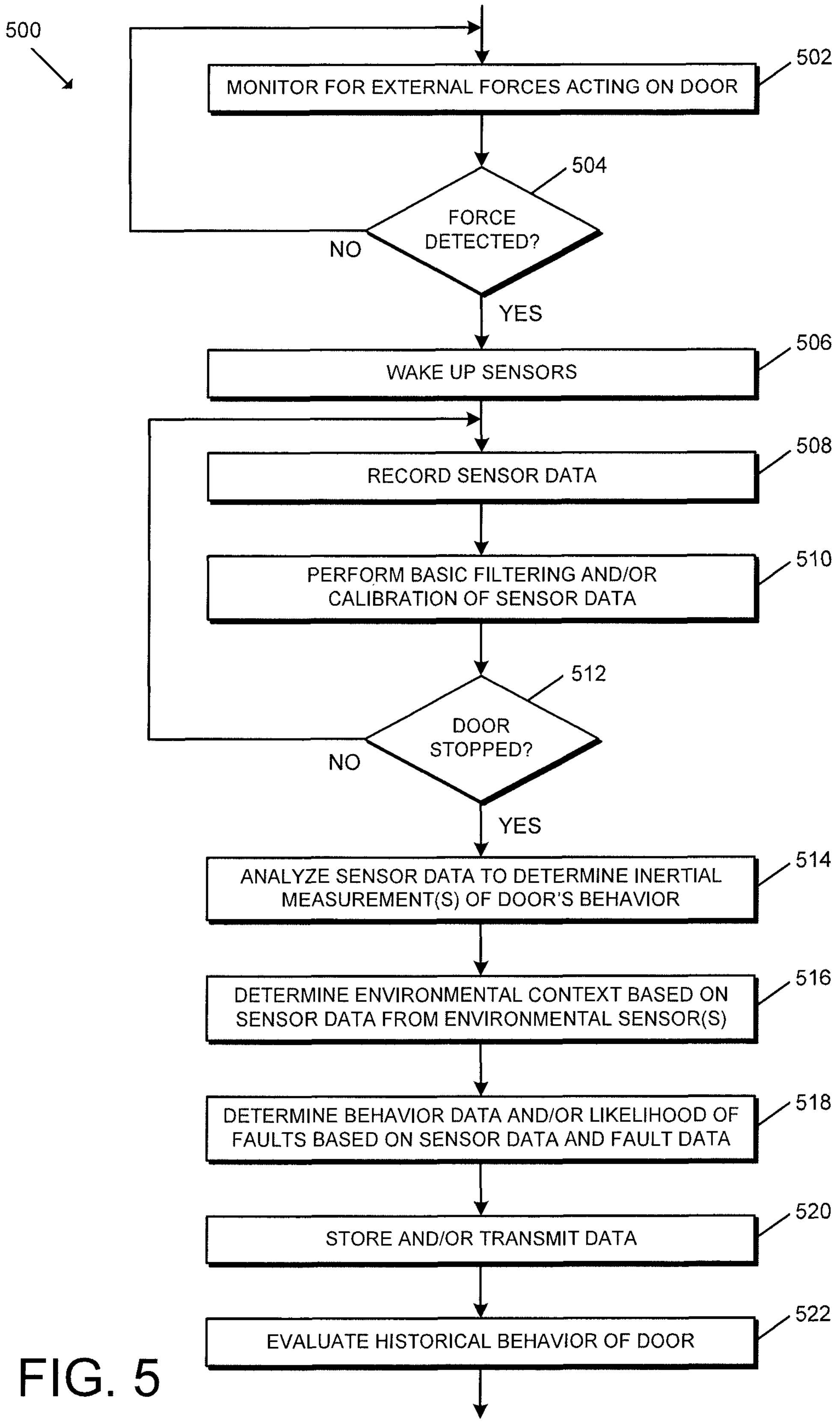

RECEIVE SENSOR DATA FROM ACCELEROMETER(S), MAGNETOMETER(S), AND/OR GYROMETER(S) ⟋602

ANALYZE ACCELEROMETER DATA TO DETECT HIGH-ACCELERATION EVENTS AND/OR HIGH-VIBRATION EVENTS ⟋604

ANALYZE GYROMETER DATA TO DETECT HIGH-VELOCITY SPIKES ⟋606

FILTER SENSOR DATA ⟋608

DETERMINE DOOR VELOCITY BASED ON FILTERED GYROMETER DATA ⟋610

DETERMINE INERTIAL MEASUREMENT(S) OF DOOR'S BEHAVIOR ⟋612

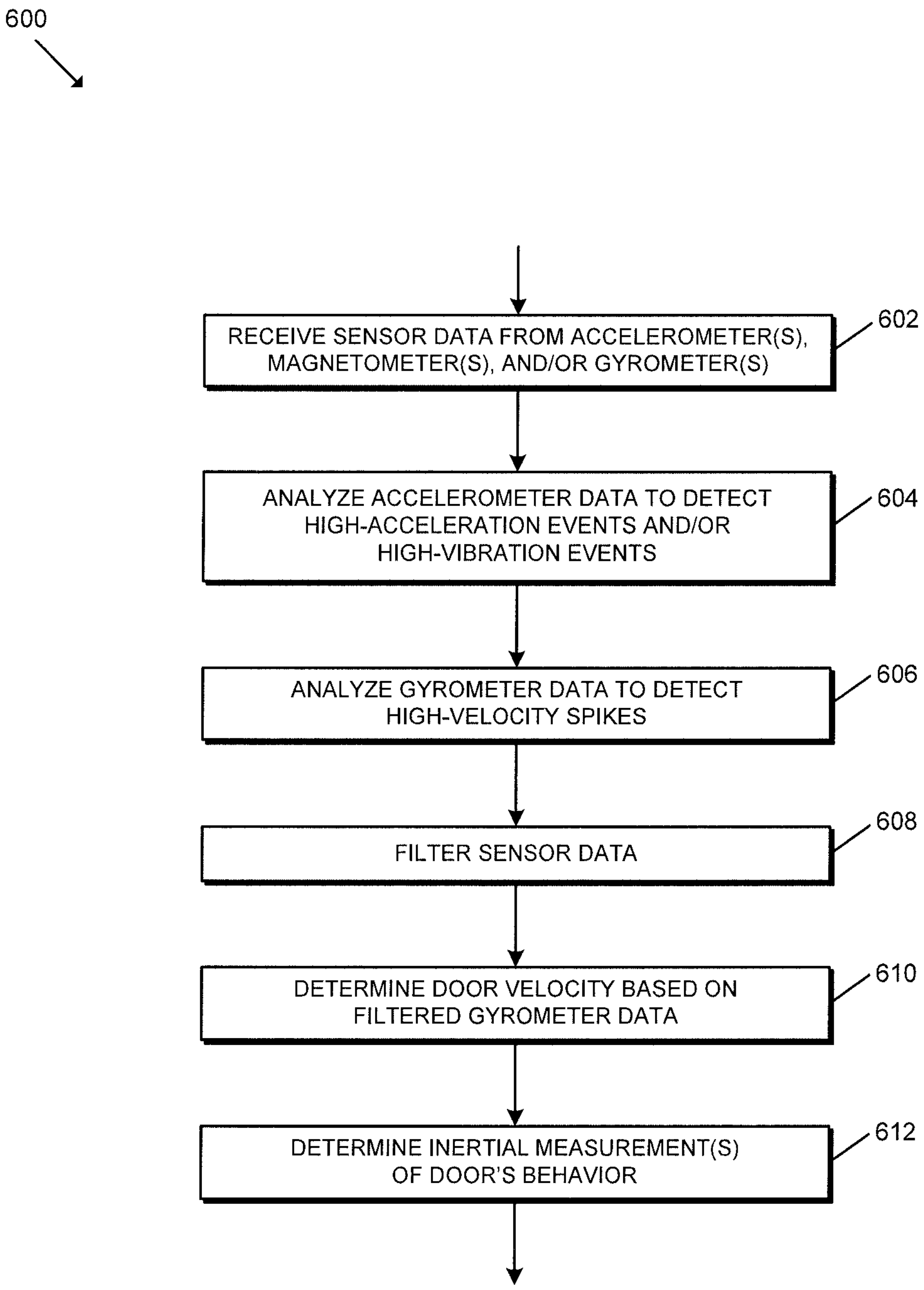

702 — RECEIVE SENSOR DATA FROM SENSORS

704 — PRE-PROCESS SENSOR DATA

706 — SEGMENT PRE-PROCESSED DATA INTO OPERATING REGIONS

708 — SELECT OPERATING REGION

710 — SELECT FEATURE

712 — GENERATE FEATURE DETECTION SCORE BASED ON SELECTED FEATURE

714 — PERFORM FEATURE DETECTION ON DATA IN SELECTED OPERATING REGION BASED ON SELECTED FEATURE

716 — ANOTHER FEATURE?
YES
NO

718 — GENERATE OPERATING REGION SCORE BASED ON FEATURE DETECTION SCORE(S)

720 — ANOTHER REGION?
YES
NO

722 — GENERATE SYSTEM SCORE(S) BASED ON OPERATING REGION SCORES

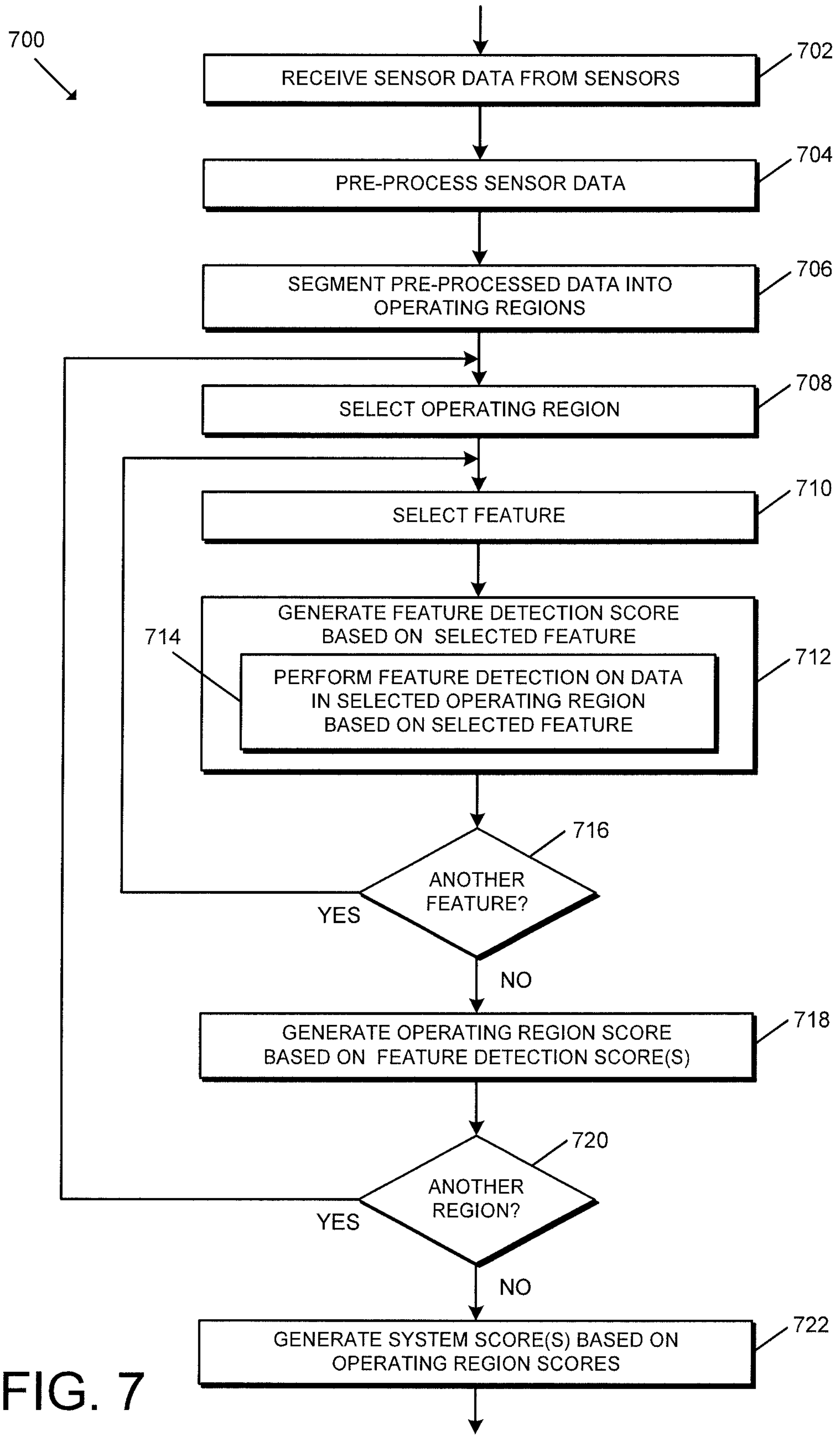

FIG. 7

DOOR FAULT IDENTIFICATION

CROSS REFERENCE TO RELATED APPLICATIONS

This application is a continuation of U.S. patent application Ser. No. 15/824,085 filed Nov. 28, 2017, the contents of which are incorporated herein by reference in their entirety.

BACKGROUND

The operation of a door typically degrades over time due to various faults or abnormalities in the operation of the door. For example, there may be hinge problems, lock problems, door closer problems, warping frames, door expansion/contraction, threshold problems, and/or other factors that prevent the door from operating properly. The root cause of the improper door operation is often difficult to diagnose, for example, because many different door faults can exhibit similar symptoms. The door faults may also slowly manifest over time, and therefore technicians and users may not recognize the problem. Or, the technicians and users may simply ignore the problem until it damages the door or surrounding structures (e.g., the door frame) or it becomes a safety or security concern.

Maintenance technicians often rely on their experience and training to identify the root cause of the abnormal/improper door operation. Typically, the maintenance technician will move the door between an open and closed position, visually inspect the door and ancillary structures for signs of wear or loose parts, listen for various sounds throughout the range of motion, and/or feel for any door vibrations or "sticking points" throughout the range of motion. More advanced examination may include, for example, using a force gauge to determine the amount of force required to open and close the door. Due to the wide array of potential door faults and associated door hardware, oftentimes, the maintenance technician must make multiple trips between the location of the door and that of the parts warehouse as the technician is troubleshooting and repairing the door.

SUMMARY

According to an embodiment, a method may include receiving sensor data from a plurality of sensors of a door device associated with a door, analyzing the sensor data to determine behavior data indicative of a behavior of the door device, and comparing the behavior data to a plurality of representative data associated with a plurality of door faults to determine a corresponding likelihood that the sensor data corresponds with each of the door faults.

In some embodiments, analyzing the sensor data may include applying one or more filters to the sensor data.

In some embodiments, analyzing the sensor data may include performing at least one of filtering or synthesizing the sensor data to determine one or more inertial measurements indicative of the behavior of the door device.

In some embodiments, the plurality of sensors may include one or more environmental sensors adapted to generate sensor data indicative of a physical environment of the door device, and analyzing the sensor data may include determining an environmental context of the door device based on the sensor data generated by the one or more environmental sensors.

In some embodiments, the behavior data may be determined based on the one or more inertial measurements and the environmental context of the door device.

In some embodiments, the behavior data may include data indicative of at least one of an acceleration of the door, a peak velocity of the door during a closing phase of the door, a peak opening angle of the door, a duration of movement of the door from the peak opening angle to a latch zone of the door, or a duration of movement of the door from the latch zone to a closed position of the door.

In some embodiments, receiving the sensor data from the plurality of sensors may include receiving accelerometer data indicative of an acceleration of the door device from one or more accelerometers, receiving gyrometer data indicative of a velocity of the door device from one or more gyrometers, and receiving magnetometer data indicative of at least one of an orientation of the door device or a magnetic field sensed by one or more magnetometers.

In some embodiments, analyzing the sensor data may include analyzing the accelerometer data to detect any high-acceleration event or high-vibration event experienced by the door device.

In some embodiments, analyzing the sensor data may include analyzing the gyrometer data to detect an abnormal velocity experienced by the door device.

In some embodiments, the method may further include monitoring for one or more external forces acting upon the door device, and waking one or more of the plurality of sensors in response to detecting an external force acting upon the door device.

In some embodiments, the method may further include displaying a most likely fault solution to a user based on the corresponding likelihood that the sensor data corresponds with each of the door faults.

In some embodiments, displaying the most likely fault solution may include displaying a recommended maintenance operation for the door.

In some embodiments, comparing the behavior data to the plurality of representative data associated with a plurality of door faults may include comparing the behavior data to representative data associated with normal operation of the door.

According to another embodiment, a door fault identification system may include at least one processor and at least one memory comprising a plurality of instructions stored thereon that, in response to execution by the at least one processor, causes the door fault identification system to receive sensor data from a plurality of sensors of a door device associated with a door, analyze the sensor data to determine behavior data indicative of a behavior of the door device, and compare the behavior data to a plurality of representative data associated with a plurality of door faults to determine a corresponding likelihood that the sensor data corresponds with each of the door faults.

In some embodiments, the behavior data may include initial behavior data, the at least one memory may include a fault prediction database stored thereon, and the plurality of instructions may further cause the door fault identification system to receive user input indicative of maintenance performed on the door, receive new sensor data from the plurality of sensors in response to receipt of the user input indicative of the maintenance performed, analyze the new sensor data to determine new behavior data indicative of the behavior of the door device, compare the new behavior data to the plurality of representative data associated with the plurality of door faults to determine a new corresponding likelihood that the new sensor data corresponds with each of the door faults, and update a fault prediction database that includes the plurality of representative data associated with the plurality of door faults based on the maintenance performed and the comparison of the new behavior data to the plurality of representative data.

In some embodiments, updating the fault prediction database may include updating weights of a machine learning algorithm, and each of the weights may be associated with a corresponding door fault.

In some embodiments, updating the fault prediction database may include updating weights of an artificial neural network.

In some embodiments, the plurality of instructions may further cause the door fault identification system to display a most likely fault solution to a user based on the corresponding likelihood that the sensor data corresponds with each of the door faults.

In some embodiments, the plurality of sensors may include an accelerometer adapted to generate accelerometer data indicative of an acceleration of the door device, a gyrometer adapted to generate gyrometer data indicative of an orientation of the door device, and a magnetometer adapted to generate magnetometer data indicative of a sensed magnetic field, and analyzing the sensor data may include analyzing the accelerometer data to detect any high-acceleration event or high-vibration event experienced by the door device and analyzing the gyrometer data to detect any high velocity spikes experienced by the door device.

In some embodiments, the plurality of sensors may further include one or more environmental sensors adapted to generate sensor data indicative of a physical environment of the door device, and analyzing the sensor data may include filtering and/or synthesizing the sensor data to determine one or more inertial measurements indicative of the behavior of the door device and determining an environmental context of the door device based on the sensor data generated by the one or more environmental sensors, and the behavior data may be determined based on the one or more inertial measurements and the environmental context of the door device.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 5 is a simplified flow diagram of at least one embodiment of a method for door fault identification;

FIG. 6 is a simplified flow diagram of at least one embodiment of a method for analyzing sensor data to determine inertial measurements of the door's behavior;

FIG. 7 is a simplified flow diagram of at least one embodiment of a method for determining the likelihoods of various door faults;

DETAILED DESCRIPTION

Figure 1:
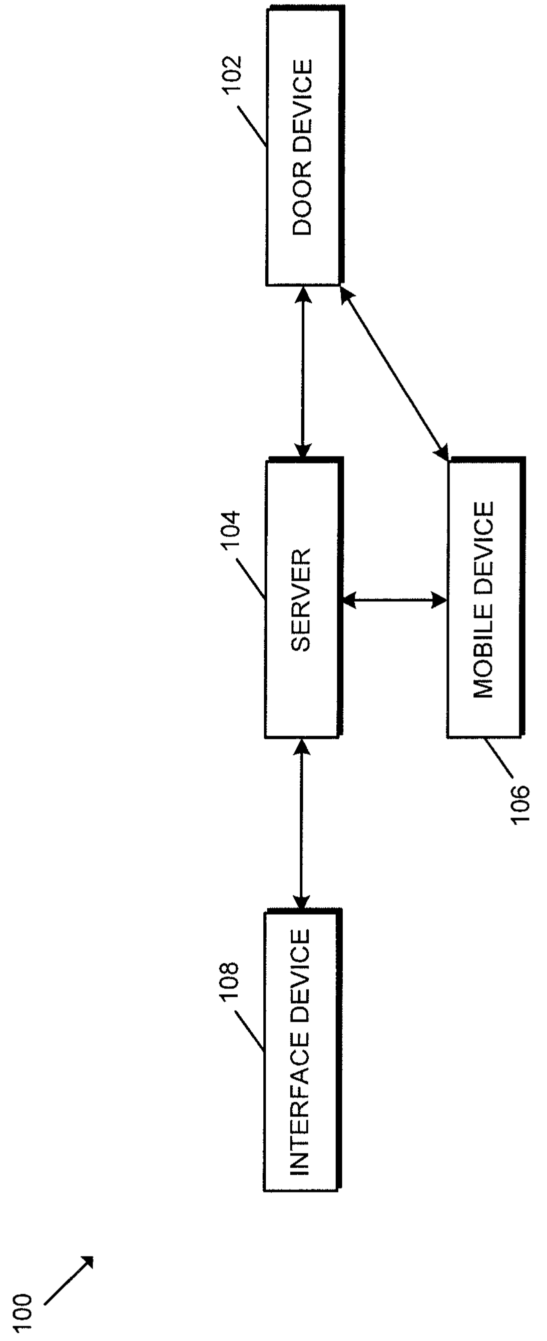
FIG. 1 is a simplified block diagram of at least one embodiment of a door fault identification system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for door fault identification includes a door device 102, a server 104, a mobile device 106, and an interface device 108. As described in greater detail below, the system 100 leverages the sensor data collected from various sensors of the door device 102 to detect abnormalities in the behavior of a door to which the door device 102 is secured and identify the corresponding fault(s) (e.g., root cause) of the abnormalities. In some embodiments, the historical logging of the sensor data and/or the subsequent analysis of that data (e.g., data derived from the filtering, synthesis, and/or other analysis of the sensor data) may allow for improved detection of door faults that arise over time.

It should be appreciated that the system 100 may provide notice to the maintenance technician before a detected door fault causes a door failure and/or identify the particular time at which a fault occurred, which may help the technician schedule repairs and better target the estimated replacement date. Additionally, the system 100 may identify and notify the technician regarding the most likely door faults based on the analysis of the sensor data, which informs the technician regarding the proper tools and parts to bring to the door site for repairs. Further, the system 100 may provide feedback to the installer of a door device 102 (e.g., a door closer) indicating whether the device was installed according to the desired parameters of operation. The techniques described herein may improve the troubleshooting ability of new or less experienced technicians, for example, by providing a list of likely faults and thereby ensuring they don't attempt to "repair" an entirely unrelated aspect of the door operation.

The system 100 may also involve an evaluation of the historical behavior of the door's operation and/or an analysis of the maintenance performed, for example, in order to improve the ability of the system 100 to accurately identify the most likely door faults based on the presented sensor data. For example, in some embodiments, the system 100 may dynamically update a fault prediction database/library based on the recommended or identified likely faults, the maintenance performed by the technician, and the resulting operation of the door. In other words, the pre-maintenance (pre-solution) and post-maintenance (post-solution) sensor data and the actual maintenance performed may be leveraged to update the fault prediction determination. Specifically, in some embodiments, the system 100 may utilize an artificial neural network 212 and/or other machine learning algorithm for fault prediction and update the various weights 214 accordingly.

It should be appreciated that each of the door device 102, the server 104, the mobile device 106, and the interface device 108 may be embodied as any type of device or collection of devices suitable for performing the functions described herein. More specifically, in the illustrative embodiment, the door device 102 may be embodied as an access control device or other device coupled to a door. For example, in various embodiments, the door device 102 may be embodied as an electronic lock (e.g., a mortise lock, a cylindrical lock, or a tubular lock), a door closer, a door operator, an auto-operator, a door-mounted credential reader, an exit device, a panic bar, a door-mounted camera system, and/or another suitable device coupled to, secured to, mounted to, embedded within, and/or integrally formed with a door. In the illustrative embodiment, the server 104 is configured to communicate with the door device 102 over a wired or wireless communication connection to exchange various data (e.g., raw sensor data, filtered/synthesized data, analyzed data, fault data, fault prediction database data, behavior data, probabilistic data, historical data, and/or other relevant data) depending on the particular embodiment. Similarly, the mobile device 106 may be configured to communicate with the door device 102 and/or the server 104 to exchange data. For example, in some embodiments, the maintenance technician may receive fault notifications or fault-related information from the door device 102 and/or the server 104. In the illustrative embodiment, the interface device 108 is communicatively coupled to the server 104 to permit a user to access the data stored thereon (e.g., such that a user may receive, view, and/or exchange data with the server 104). Further, in some embodiments, the system 100 may include a gateway device communicatively coupled to the door device 102 such that other devices of the system 100 (e.g., the server 104 and/or the mobile device 106) may communicate with the door device 102 via the gateway device.

In some embodiments, the door device 102 may communicate with the server 104 and/or the mobile device 106 over any suitable wireless communication connection (e.g., Bluetooth, Wi-Fi, etc.) established between the door device 102 and the device 104, 106. Additionally, in the illustrative embodiment, the mobile device 106 may communicate with the server 104 using any suitable wireless communication connection. For example, in various embodiments, the mobile device 106 may communication with the server 104 over Wi-Fi, WiMAX, a WAN (e.g., the Internet), and/or a suitable telecommunications network/protocol. As such, it should be appreciated that the illustrative server 104 may be located at one or more remote locations relative to the devices 102, 106. In other embodiments, it should be appreciated that one or more of the communication connections may be wired. The interface device 108 may be embodied as any device local or remote to the server 104 and, therefore, may be configured to communicate with the server 104 over any suitable communication connection. For example, in some embodiments, the interface device 108 may be embodied as another mobile device, whereas in other embodiments, the interface device 108 may be embodied as a peripheral device coupled to the server 104.

It should be appreciated that each of the door device 102, the server 104, the mobile device 106, and/or the interface device 108 may be embodied as a computing device similar to the computing device 200 described below in reference to FIG. 2. For example, in the illustrative embodiment, each of the door device 102, the server 104, and the mobile device 106 includes a processing device 202 and a memory 206 having stored thereon operating logic 208 for execution by the processing device 202 for operation of the corresponding device. Additionally, in some embodiments, the interface device 108 may also include a processing device 202, memory 206, and operating logic 208. Further, in some embodiments, it should be appreciated that the door device

102 may include an environment (e.g., a hardware environment) similar to the environment 300 as described below in reference to FIG. 3.

It should be further appreciated that, although the server 104 is described herein as one or more computing devices outside of a cloud computing environment, in other embodiments, the server 104 may be embodied as a cloud-based device or collection of devices. Further, in cloud-based embodiments, the server 104 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 104 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 104 described herein. For example, when an event occurs (e.g., data is transferred to the server 104 for analysis), the virtual computing environment may be communicated with (e.g., via a request to an API of the virtual computing environment), whereby the API may route the request to the correct virtual function (e.g., a particular server-ambiguous computing resource) based on a set of rules. As such, when a request for data analysis or application of machine learning is made, the appropriate virtual function(s) may be executed to perform the appropriate analysis and transmit the information back to the door device 102 and/or to storage before eliminating the instance of the virtual function(s).

Although only one door device 102, one server 104, one mobile device 106, and one interface device 108 are shown in the illustrative embodiment of FIG. 1, the system 100 may include multiple door devices 102, servers 104, mobile devices 106, and/or one interface devices 108 in other embodiments. For example, as indicated above, the server 104 may be embodied as multiple servers in a cloud computing environment in some embodiments. Further, in some embodiments, maintenance technicians may use different mobile devices 106 to communicate with the door device 102 and/or the server 104.

Figure 2:
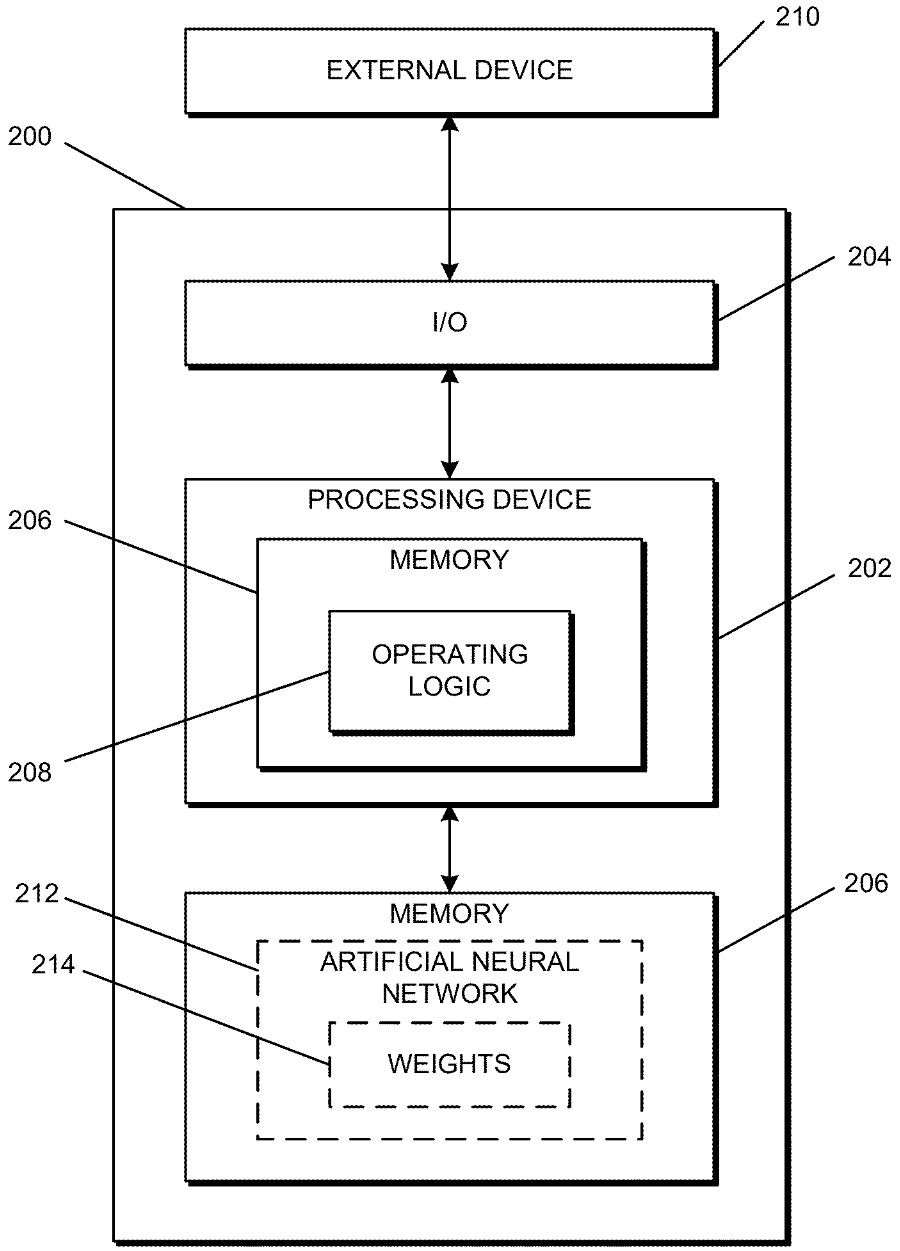
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a door device, server, mobile device, and/or interface device that may be utilized in connection with the door device 102, the server 104, the mobile device 106, and/or the interface device 108 illustrated in FIG. 1. Depending on the particular embodiment, computing device 200 may be embodied as a reader device, credential device, access control device, door closer (e.g., closer, operator, or auto-operator), server, desktop computer, laptop computer, tablet computer, notebook, netbook, Ultrabook™, mobile computing device, cellular phone, smartphone, wearable computing device, personal digital assistant, Internet of Things (IoT) device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the door device 102, the server 104, the mobile device 106, and/or the interface device 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
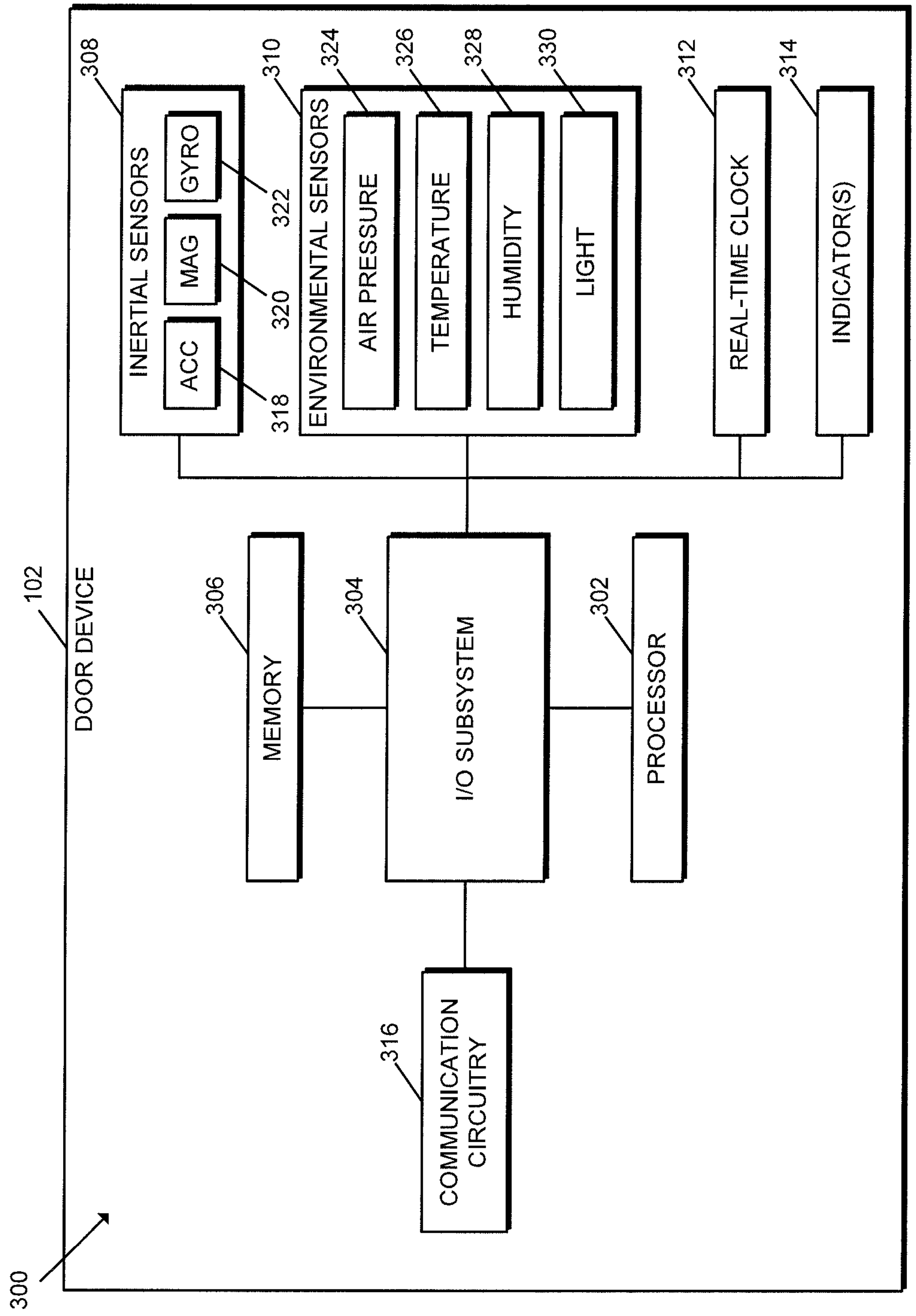
FIG. 3 is a simplified block diagram of at least one embodiment of a door device of the system of FIG. 1.

Referring now to FIG. 3, a simplified block diagram of at least one embodiment of an environment 300 of the door device 102 is shown. The illustrative environment 300 includes a processor 302, an input/output ("I/O") subsystem 304, a memory 306, inertial sensors 308, environmental sensors 310, a real-time clock 312, one or more indicators 314, and communication circuitry 316. It should be appreciated that one or more of the components of the environment 300 described herein may be embodied as, or form a portion of, one or more embedded controllers and/or integrated circuits of the door device 102. For example, in some embodiments, the processor 302, the I/O subsystem 304, the memory 306 and/or other components of the door device 102 may be embodied as, or form a portion of, a microcontroller or SoC. Further, depending on the particular embodiment, the components of the environment 300 may be closely positioned to one another or distributed throughout the door device 102 (i.e., separated from one another). In some embodiments, one or more of the components of the environment 300 (e.g., a sensor 308, 310) may be located external to a housing (e.g., a primary housing) of the door device 102.

The processor 302 may be embodied as any type of processor(s) capable of performing the functions described herein. In particular, the processor 302 may be embodied as one or more single or multi-core processors, microcontrollers, or other processor or processing/controlling circuits. For example, in some embodiments, the processor 302 may include or be embodied as an arithmetic logic unit (ALU), central processing unit (CPU), digital signal processor (DSP), and/or another suitable processor(s). The processor 302 may be a programmable type, a dedicated hardwired state machine, or a combination thereof. Processors 302 with multiple processing units may utilize distributed, pipelined, and/or parallel processing in various embodiments. Further, the processor 302 may be dedicated to performance of just the operations described herein, or may be utilized in one or more additional applications. In the illustrative embodiment, the processor 302 is of a programmable variety that executes algorithms and/or processes data in accordance with operating logic as defined by programming instructions (such as software or firmware) stored in the memory 306. Additionally or alternatively, the operating logic for the processor 302 may be at least partially defined by hardwired logic or other hardware. Further, the processor 302 may include one or more components of any type suitable to process the signals received from input/output devices or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of door device 102 such as operating systems (e.g., real-time operating systems (RTOS)), applications, programs, libraries, and drivers. The memory 306 is communicatively coupled to the processor 302 via the I/O subsystem 304, which may be embodied as circuitry and/or components to facilitate input/output operations with the processor 302, the memory 306, and other components of the door device 102. For example, the I/O subsystem 304 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. Depending on the particular embodiment, the memory 306 may be included with the processor 302 and/or coupled to the processor 302 depending on the particular embodiment. For example, in some embodiments, the processor 302, the I/O subsystem 304, the memory 306, and/or other components of the environment 300 may form a portion of a system-on-a-chip (SoC) and be incorporated on a single integrated circuit chip.

The inertial sensors 308 are configured to generate sensor data (e.g., by virtue of one or more signals), which may be interpreted by the processor 302 to determine one or more inertial characteristics of the door device 102. For example, in some embodiments, the inertial sensors 308 may include one or more accelerometers 318 (e.g., 2-axis or 3-axis accelerometers), one or more magnetometers 320 (e.g., 1-axis, 2-axis, or 3-axis magnetometers), and/or one or more gyrometers 322 (e.g., 1-axis, 2-axis, or 3-axis gyrometers). In other embodiments, the inertial sensors 308 may include additional or alternative sensors to determine the same and/or other inertial characteristics of the door device 102.

Figure 4:
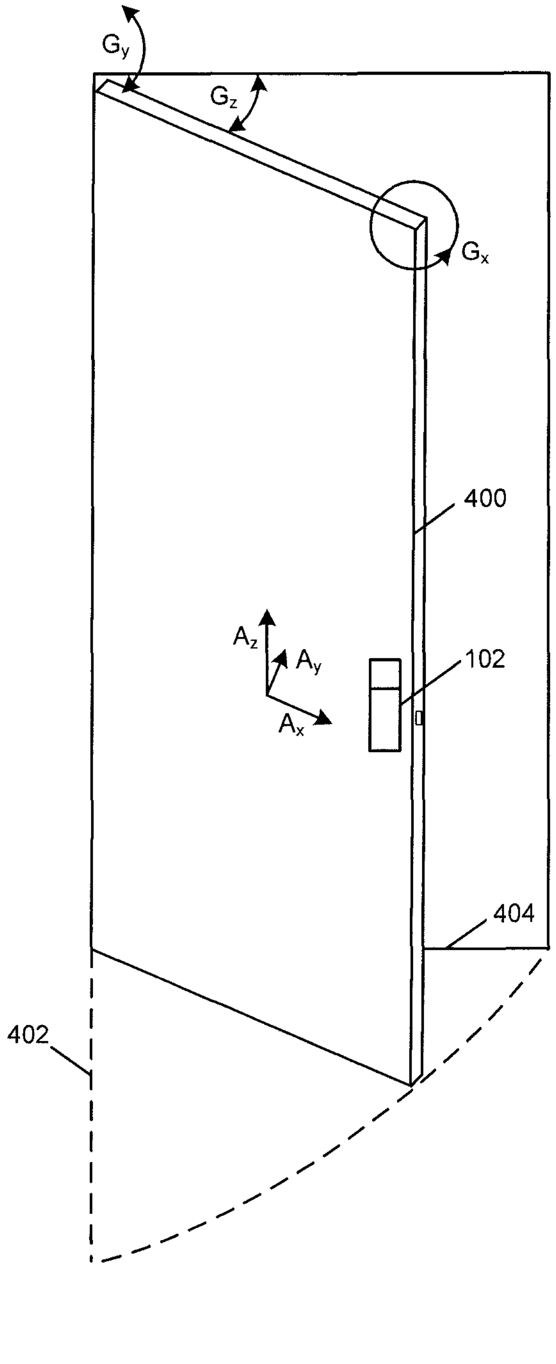
FIG. 4 illustrates various inertial characteristics of the door device of FIG. 3.

As shown in reference to FIG. 4, the door device 102 is depicted as an electronic lock secured to a door 400. Further, the illustrative door device 102 includes one or more accelerometers 318 sensing, individually or collectively, acceleration of the door device 102 along at least three different (e.g., orthogonal) axes and one or more gyrometers 322 sensing, individually or collectively, orientation of the door device 102 about at least three different (e.g., orthogonal) axes. That is, the gyrometers 322 sense the roll, pitch, and yaw of the door device 102. In particular, the illustrative one or more accelerometers 318 include the $A_x$, $A_y$, and $A_z$ axes and the illustrative one or more gyrometers 322 sense the orientation $G_x$ of the door device 102 about the $A_x$ axis, the orientation $G_y$ of the door device 102 about the $A_y$ axis, and the orientation $G_z$ of the door device 102 about the $A_z$ axis. It should be further appreciated that the gyrometer data may be indicative of the angular velocity of the door device 102. As described in greater detail below, the sensor data (e.g., acceleration data and gyrometer data) generated by the sensors may be analyzed throughout the range of motion of the door 400 between the open position 402 and the closed position 404. Although the open position 402 is depicted as a fully open position at ninety degrees and the closed position 404 is depicted as a fully closed position at zero degrees, it should be appreciated that, in the illustrative embodiment, the sensor data may be analyzed based on the techniques described herein regardless of whether the door 400 is fully opened or fully closed. Indeed, in some embodiments, the problem exhibited by the door 400 may be, for example, a failure to fully close. Further, in some embodiments, the fully open position may be greater or less than ninety degrees.

The environmental sensors 310 are configured to generate sensor data (e.g., by virtue of one or more signals), which may be interpreted by the processor 302 to determine one or more corresponding internal or external environmental characteristics of the door device 102. For example, in some embodiments, the environmental sensors 310 may include one or more air pressure sensors 324 configured to determine the air pressure in the external physical environment of the door device 102. In such embodiments, the pressure sensors 324 may be embodied, for example, as single or differential pressure sensors. Further, in some embodiments, the environmental sensors 310 may include one or more temperature sensors 326 configured to determine one or more internal temperatures of the door device 102 and/or the temperature of the external physical environment of the door device 102. In such embodiments, the temperature sensors 326 may be embodied as infrared or direct measurements sensors. In some embodiments, one or more of the temperature sensors 326 may be embodied as a temperature-dependent resistor. Additionally, in some embodiments, the environmental sensors 310 may include one or more humidity sensors 328 (e.g., hydrometers) configured to determine a humidity of the physical environment of the door device 102 and/or one or more light sensors 330 configured to sense an amount of light in the physical environment of the door device 102. In such embodiments, one or more of the light sensors 330 may be embodied as, or otherwise include, a photo-diode or other suitable light-sensing mechanism. In other embodiments, the environmental sensors 310 may include additional or alternative sensors to determine other environmental characteristics of the door device 102.

It should be appreciated that, in some embodiments, additional and/or alternative sensors other than those described above may be included in the environment 300. For example, in various embodiments, the sensors may be embodied as, or otherwise include, proximity sensors, optical sensors, light sensors, electromagnetic sensors, hall effect sensors, audio sensors (e.g., microphones), temperature sensors, motion sensor, piezoelectric sensors, cameras, and/or other types of sensors. Of course, the environment 300 may also include components and/or devices configured to facilitate the use of the sensors. By way of example, the sensors may detect various characteristics of the physical environment of the door device 102 (internal and/or external to the door device 102), electrical characteristics of the door device 102, electromagnetic characteristics of the door device 102 or its surroundings, and/or other suitable characteristics. Data from the sensors may be used by the door device 102 or, more particularly, the processor 302 to determine whether the door is operating properly/normally and, if not, identify the door fault(s) most likely to be the root cause of the improper operation. In other embodiments, as described herein, the door device 102 may transmit the sensor data or a calibrated, filtered, synthesized, and/or otherwise processed version thereof to the server 104 for identification of the door fault(s). It should be further appreciated that, in some embodiments, one or more of the sensors of the door device 102 may be embodied as a microelectromechanical systems (MEMS) device.

The real-time clock 312 is configured to track the amount of time associated with various conditions of the door device 102. For example, as described herein, the real-time clock 312 may be used to determine the amount of time that lapsed throughout various stages of the opening/closing of the door. That is, the real-time clock 312 may be used to track the amount of time the door was within one or more door zones. Although the real-time clock 312 is shown as a discrete component in FIG. 3, it should be appreciated that the real-time clock 312 may form a portion of another component of the door device 102 in other embodiments. For example, in some embodiments, the processor 302 may include the real-time clock 312. It should be appreciated that, in some embodiments, the real-time clock 312 may be a software- or firmware-implemented timer. Further, in other embodiments, the real-time clock 312 may be embodied as any type of timer or counter suitable for performing the functions described herein.

The one or more indicators 314 may be embodied as any one or more devices or components configured to display a message to a user of the door device 102. For example, in some embodiments, the indicator(s) 314 may indicate to the user whether the door is operating properly. Depending on the particular embodiment, the indicator(s) 314 may be embodied, or otherwise include, an e-ink display, LEDs, light pipes, LCDs, and/or other suitable visual indicator(s). In some embodiments, the indicator(s) 314 may be embodied as a mechanically-driven display system that includes two or more messages.

The communication circuitry 316 may be embodied as any communication circuitry, transceiver, device, or collection thereof, capable of enabling communications between the door device 102 and other remote devices (e.g., the server 104, the mobile device 106, and/or other remote devices). The communication circuitry 316 may be configured to use any one or more wired and/or wireless communication technologies and associated protocols. For example, in some embodiments, the illustrative door device 102 may be configured to communicate via Wi-Fi (e.g., infrastructure or ad hoc mode), Wi-Fi Direct, Bluetooth (including Bluetooth Low Energy (BLE)), Zigbee, Near Field Communication (NFC), IEEE 902.15, and/or other suitable wireless communication protocol(s). Further, in some embodiments, the door device 102 may be configured to communicate via Ethernet, serial communication links, and/or another suitable wired communication mechanism.

It should be appreciated that the environment 300 may include additional or alternative components, such as those commonly found in a door device, in other embodiments. Further, in some embodiments, one or more of the components of the environment 300 described herein may be omitted from the environment 300 of a particular door device 102.

Referring now to FIG. 5, in use, the system 100 may execute a method 500 for door fault identification. As described above, depending on the particular embodiment, each of the blocks of the method 500 may be executed by the door device 102 and/or the server 104. However, for brevity of the description, the method 500 is described herein as being primarily executed by the door device 102. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the door device 102 monitors for external forces acting on the door. If a force is detected in block 504, the door device 102 wakes the sensors (e.g., the sensors 308, 310) of the door device 102 from a sleep state or low power state in block 506. For example, in some embodiments, one or more of the sensors of the door device 102 (e.g., an accelerometer) may be powered and configured to sense door movement, and in response to detection of the force, the other sensors of the door device 102 may be powered or changed from the low power state to a higher power state (e.g., via a command from the processor 302). In some embodiments, the processor 302 may transmit a wake-up signal to the sensors and/or other components of the door device 102 to transition the sensors/components to a powered (or more fully powered) state. In other embodiments, it should be appreciated that the door device 102 and/or one or more of the sensors may remain in a fully powered state such that it unnecessary to wake the device/sensors.

In block 508, the door device 102 records the sensor data generated by the sensors (e.g., the sensors 308, 310). For example, in some embodiments, the sensor data may be stored in the memory 306 of the door device 102 for subsequent analysis. In block 510, the door device 102 may perform filtering and/or calibration of the sensor data. For example, in some embodiments, the door device 102 may perform basic filtering (e.g., to "smooth" out the data) and calibrate the data values in preparation for the analysis described herein. Depending on the particular embodiment, the door device 102 may filter and/or calibrate the sensor data in real-time or after the data collection has concluded (e.g., depending on the particular hardware architecture of the environment 300).

In block 512, the door device 102 determines whether the door has stopped moving (e.g., for at least a predetermined threshold period of time). If not, the method 500 returns to block 508 in which the door device 102 continues to record the sensor data. In other words, in the illustrative embodiment, the door device 102 records the sensor data throughout the relevant range of motion of the door. As described below, a door fault may cause the door may be stopped without going through the full range of anticipated motion (e.g., before closing). As such, it should be appreciated that the range of motion of the door may vary depending on the particular door, any existing door faults, and/or other operational considerations.

As described herein, in some embodiments, the door device 102 may filter, calibrate, and analyze the sensor data. However, in other embodiments, the server 104 may perform one or more of those functions. Accordingly, it should be appreciated that the door device 102 may transmit the raw sensor data, the filtered sensor data, the calibrated sensor data, the filtered and calibrated sensor data, and/or other analyzed/processed versions thereof to the server 104 for further analysis.

If the door device 102 determines that the door has stopped moving (e.g., for at least a predetermined threshold period of time), the method 500 advances to block 514 in which the door device 102 and/or the server 104 analyzes the sensor data to determine one or more inertial measurements of the door's behavior. To do so, the door device 102 and/or the server 104 may execute the method 600 of FIG. 6 described below. In block 516, the door device 102 and/or the server 104 determines an environmental context of the door device 102 based on the sensor data generated by the environmental sensors 310 or data derived therefrom. For example, in some embodiments, the environmental context of the door device 102 may describe or indicate the internal and/or external air pressures, temperatures, humidity, and/or light experienced by the door device 102. Further, in some embodiments, the environmental context may identify any abrupt changes in an environmental parameters or characteristic.

In some embodiments, the analysis of the sensor data (e.g., from the sensors 308, 310) may include applying various filters (e.g., per-channel averaging filters, multiple-channel filtering, and/or other suitable filters), performing various data synthesis (e.g., multiple sensor synthesis), performing cross-correlation analysis, and/or otherwise analyzing the sensor data or data derived therefrom. For example, in some embodiments, the inertial sensors 308 may include a 6-axis or 9-axis inertial measurement unit (IMU) that allows for multiple sensor data streams to be analyzed, averaging out the errors, and synthesizing the data into a single, higher quality signal indicative of the corresponding inertial measurement(s) of the door device 102. In some embodiments, multiple sensors may be "combined" by leveraging linear (or non-linear) quadratic estimation techniques, such as a Kalman filter, or employing similar techniques, which may allow noise and drift in the data to be eliminated or reduced.

In block 518, the door device 102 and/or the server 104 determines behavior data indicative of the behavior of the door device 102 based on the sensor data and/or data derived therefrom. It should be appreciated that the behavior data may vary depending on the particular embodiment. For example, in various embodiments, the behavior data may be indicative of one or more accelerations of the door (e.g., a maximum acceleration, a minimum acceleration, an average acceleration, a standard deviation of acceleration, maximum acceleration within the latch region, etc.), a peak velocity of the door during a closing phase of the door, a peak opening angle of the door, a duration of movement of the door from the closed position to the maximum open position, a duration of movement of the door from the maximum open position to the closed position, a duration of movement of the door from the peak opening angle to a latch zone of the door, or a duration of movement of the door from the latch zone to a closed position of the door, a temperature (e.g., at the start, middle, and/or end of the open/close phase), a humidity (e.g., at the start, middle, and/or end of the open/close phase), an air pressure (e.g., at the start, middle, and/or end of the open/close phase), and/or a light intensity (e.g., at the start, middle, and/or end of the open/close phase). However, it should be appreciated that the behavior data may include data indicative of other characteristics of the door device 102 and/or its physical environment.

Additionally, in block 518, the door device 102 and/or the server 104 may determine the likelihood of various faults (e.g., identified in a fault prediction database) based on the sensor data and/or data derived therefrom and fault data indicative of one or more possible door faults. For example, the analyzed sensor data (e.g., the behavior data) may be compared to representative fault data (e.g., one or more historical signals) corresponding with faults stored in a fault prediction database. Based on the comparison, the door device 102 and/or the server 104 may determine the likelihood that the analyzed sensor data (e.g., the behavior data) corresponds with one or more (e.g., each) of the faults in the fault prediction database. More specifically, in some embodiments, the comparison and/or other analysis may yield a percentage likelihood/probability that the sensor data corresponds with the representative fault data and, therefore, with the fault. It should be appreciated that the representative fault data may be pre-stored on the door device 102 and/or the server 104 depending on the particular embodiment. In some embodiments, the representative fault data (e.g., historical signals) may be identified in a laboratory environment and/or created/modified over time. In some embodiments, the door device 102 and/or the server 104 may execute the method 700 of FIG. 7 in determining the likelihood of various faults as described below.

In block 520, the door device 102 and/or the server 104 may store and/or transmit the various data described above. In some embodiments, the likelihoods may be communicated from the door device 102 or server 104 to a maintenance department (e.g., to the interface device 108), via a wired and/or wireless communication connection, via audible codes or indicators (e.g., the indicator(s) 314), and/or through another suitable mechanism. In some embodiments, the sensor data, analyzed data, and/or determined likelihoods may be transmitted according to a predetermined schedule (e.g., periodically).

In some embodiments, in block 522, the door device 102 and/or the server 104 may evaluate the historical behavior of the door. For example, as described herein, the door device 102 and/or the server 104 may analyze the maintenance performed (e.g., identified based on user input) in order to improve the ability to accurately identify the most likely door faults based on the instant sensor data. To do so, in some embodiments, the door device 102 and/or the server 104 may execute the method 1500 of FIGS. 15-16. Further, in some embodiments, the historical door behavior may be analyzed to determine whether there are any trends and, if so, the maintenance technician may be notified.

Although the blocks 502-522 are described in a relatively serial manner, it should be appreciated that various blocks of the method 500 may be performed in parallel in some embodiments.

Referring now to FIG. 6, in use, the system 100 may execute a method 600 for analyzing sensor data to determine inertial measurements of the door's behavior. As described above, depending on the particular embodiment, each of the blocks of the method 600 may be executed by the door device 102 and/or the server 104. However, for brevity of the description, the method 600 is described herein as being primarily executed by the door device 102. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the door device 102 receives the sensor data from the one or more accelerometers 318, the one or more magnetometers 320, and the one or more gyrometers 332. As described above, the sensor data is further filtered, synthesized, and/or otherwise analyzed. For example, in the illustrative embodiment, the door device 102 analyzes the accelerometer data generated by the accelerometer(s) 318 to detect any high-acceleration events (e.g., from someone or something abusing the door, impacts to the door, the door hitting the frame or latch, etc.), high-vibration events (e.g., from the door rubbing against the frame or ground), and/or other abnormal acceleration. Further, in block 606, the door device 102 analyzes the gyrometer data generated by the gyrometer(s) 332 to detect any high-velocity spikes (e.g., correlating with any detected acceleration spikes) and/or other abnormal velocity. In other embodiments, it should be appreciated that the sensor data may be further analyzed to detect one or more other characteristics of the corresponding signals.

In block 608, the door device 102 filters the sensor data to "smooth" the data without degrading the data to the extent that the signal characteristics described herein are unidentifiable. For example, in some embodiments, the sensor data (e.g., the data from the sensors 308, 310) may pass through a finite impulse response (FIR) filter, an infinite impulse response (IIR) filter, an averaging or Gaussian filter (e.g., a running average filter), and/or other suitable filter(s). In block 610, the door device 102 determines the door velocity based on the filtered gyrometer data. Further, in block 612, the door device 102 determines one or more inertial measurements of the door's behavior based on the filtered sensor data. For example, in some embodiments, the sensor data may be "combined" to create one or more inertial measurement values that serve as a high accuracy representation of the door's actual inertial behavior.

Although the blocks 602-612 are described in a relatively serial manner, it should be appreciated that various blocks of the method 600 may be performed in parallel in some embodiments.

Referring now to FIG. 7, in use, the system 100 may execute a method 700 for determining the likelihoods of various door faults. As described above, depending on the particular embodiment, each of the blocks of the method 700 may be executed by the door device 102 and/or the server 104. However, for brevity of the description, the method 700 is described herein as being primarily executed by the door device 102. It should be appreciated that the particular blocks of the method 700 are illustrated by way of example, and such blocks may be combined or divided, added or removed, and/or reordered in whole or in part depending on the particular embodiment, unless stated to the contrary.

The illustrative method 700 begins with block 702 in which the door device 102 receives the sensor data (e.g., raw data) from the sensors (e.g., the sensors 308, 310). In block 704, the door device 102 pre-processes the sensor data to generate "sanitized" or "calibrated" sensor data that is meaningful. For example, in some embodiments, the sensor data is indicative of the door angle, door speed, orientation (gyrometer), air pressure, temperature, and/or other contextual information and may be expressed in raw units of measure (e.g., ohms, volts, etc.). Further, in some embodiments, the sanitized data may be indicative of similar features and may be expressed in engineering units (e.g., degrees, meters per second, etc.), filtered, synthesized, and/or otherwise processed.

Figure 9:
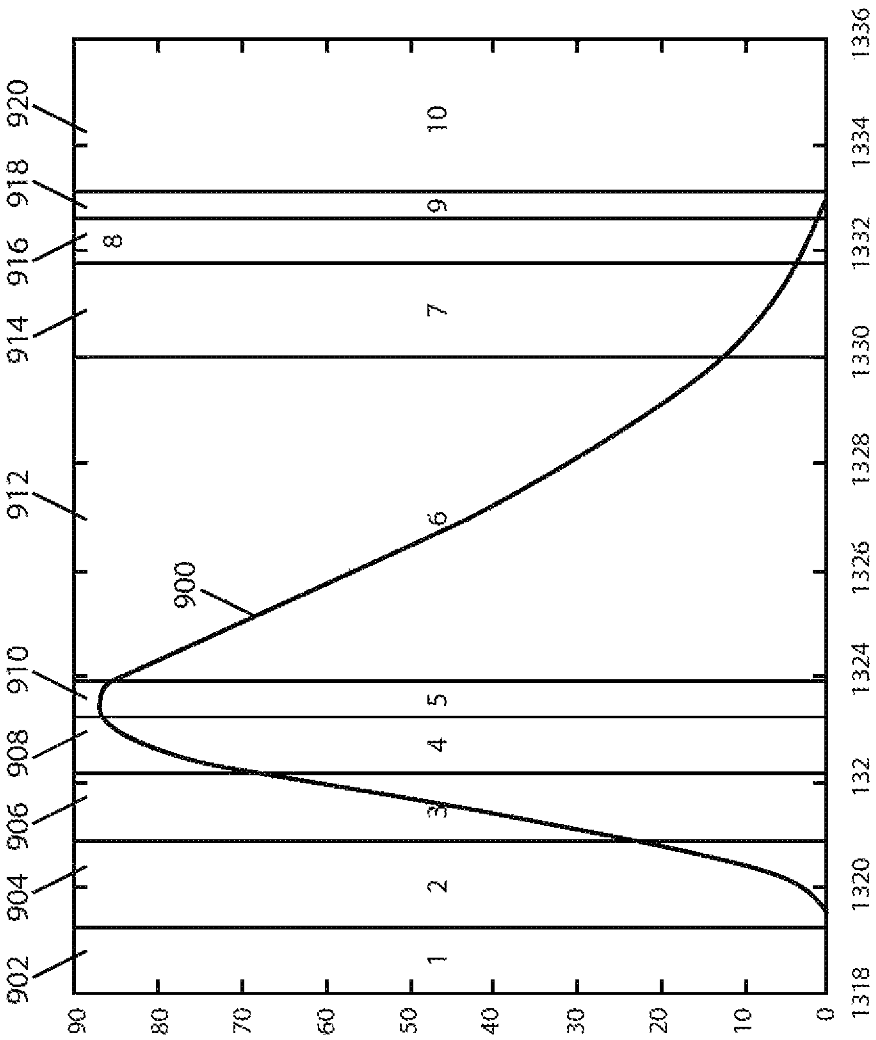
FIG. 9 is a graph depicting various door zones of motion of the door according to at least one embodiment.

In block 706, the pre-processed data may be segmented into a plurality of operating regions associated with the predefined door zones. For example, in some embodiments, the door device 102 may segment the data into door zones similar to those depicted in FIG. 9. It should be appreciated that FIG. 9 illustrates a door angle signal 900 (e.g., determined from a potentiometer or an analysis of other sensor data) indicative of an angle of the door relative to the closed position and ten predefined door zones 902-920. Specifically, the illustrative door zones include an initial opening zone 902 (e.g., 0-1 degrees), a latch zone during opening 904 (e.g., 1-15 degrees), a main zone during opening 906 (e.g., 15-70 degrees), a backcheck zone 908 (e.g., 70+ degrees), a hold-open zone 910 (e.g., door not moving but not in the frame), a main zone during closing 912 (e.g., max angle to 15 degrees), a latch zone during closing 914 (e.g., 15-3 degrees), a frame zone during closing 916 (e.g., 3-1 degrees), a closed position 918 (e.g., 1-0 degrees), and a resting position 920 (e.g., 0 degrees). However, it should be appreciated that the door device 102 may segment the data into a different number of and/or otherwise characterized operating regions in other embodiments.

In block 708, the door device 102 selects one of the operating regions (e.g. door zones). Further, the door device 102 selects a feature (e.g., maximum velocity of the door during close) in block 710 and generates a feature detection score based on the selected feature in block 712. In particular, in block 714, the door device 102 may perform feature detection on the data in the selected operating region based on the selected feature. In some embodiments, it should be appreciated that the door device 102 may utilize any suitable feature extraction, feature detection, and/or score fusion algorithms, techniques, and/or mechanisms for generating the feature detection score. It should be further appreciated that each of the door faults may be associated with one or more features in one or more of the operating regions.

In block 716, the door device 102 determines whether to select another feature. In other words, in some embodiments, the door device 102 determines whether there are any remaining features for which a feature detection score has not yet been generated. If so, the method 700 returns to block 710 in which the door device 102 selects another feature and generates the feature detection score for that feature. Otherwise, the method 700 advances to block 718 in which the door device 102 generates an operating region score based on the one or more feature detection scores generated for the selected operating region (e.g., door zone). It should be appreciated that the operating region score may be based on a score fusion of the feature detection scores determined for that region. In some embodiments, the operation region score may be indicative of potential issues in the selected operating region (e.g., the door closer is leaking in the main zone, the latch is not completing in the latch zone, etc.).

In block 720, the door device 102 determines whether to select another operating region. In other words, in some embodiments, the door device 102 determines whether there are any remaining operation regions (e.g., door zones) for which an operating region score has not yet been generated. If so, the method 700 returns to block 708 in which the door device 102 selects another operating region, determines the feature detection scores for that operating region, and generates an operating region score based on those feature detection scores as described above. Otherwise, the method 700 advances to block 722 in which the door device 102 generates one or more system scores based on the various operating region scores. In the illustrative embodiment, the system scores may identify the likelihoods of various door faults based on the analyses described herein. Further, it should be appreciated that, in some embodiments, the method 700 may be executed in conjunction with an artificial neural network 212 or other suitable machine learning algorithm(s). In such embodiments, it should be appreciated that the system scores may be embodied as the output values of the neural network 212 or machine learning. In some embodiments, the system scores may only identify a predefined number of the most likely faults identified.

Although the blocks 702-722 are described in a relatively serial manner, it should be appreciated that various blocks of the method 700 may be performed in parallel in some embodiments.

Figure 8:
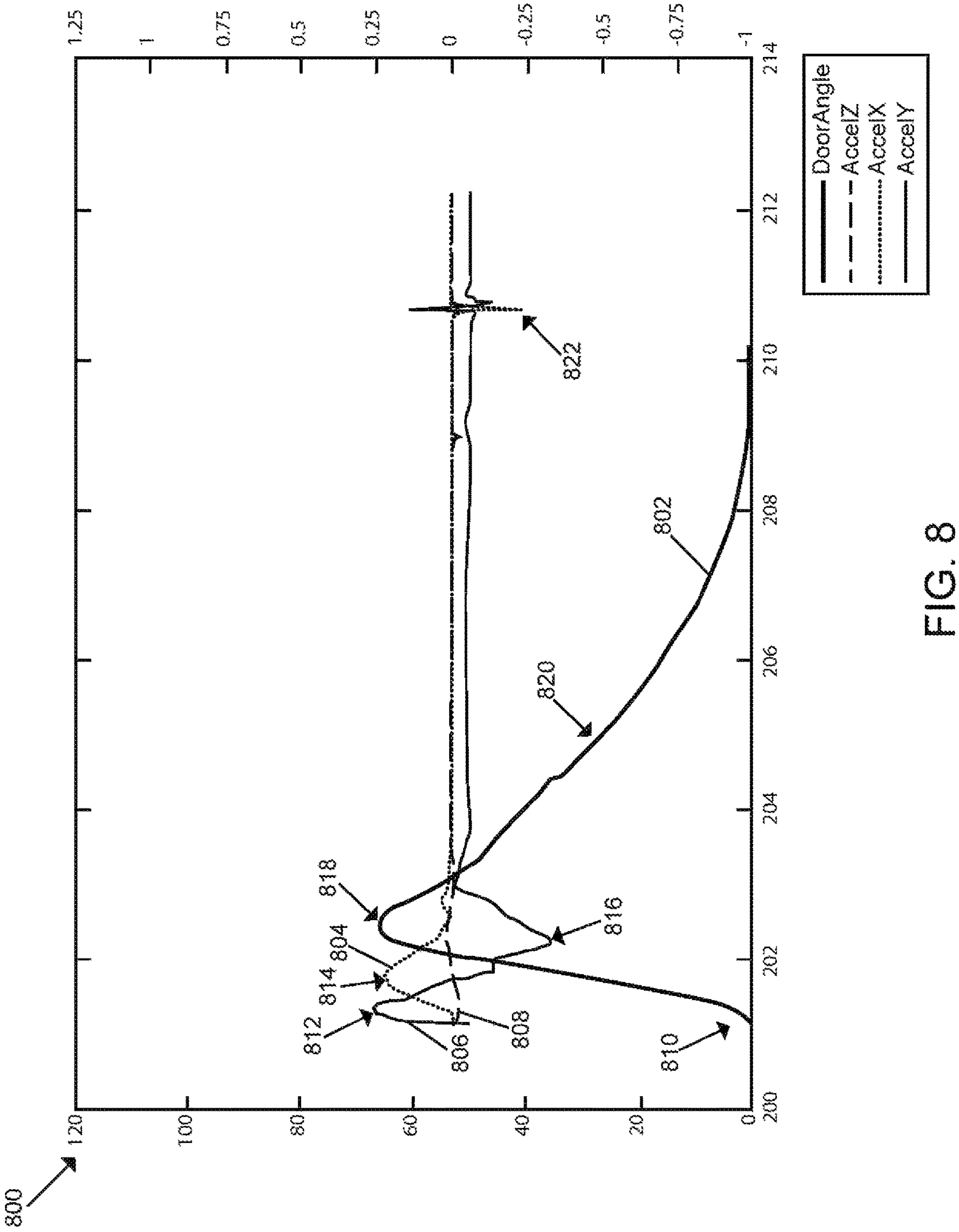
FIG. 8 is a graph depicting sensor data for normal operations of the door according to at least one embodiment.

Referring now to FIG. 8, a graph 800 depicting the sensor data expected for normal operation of the door according to at least one embodiment. As shown, the sensor data depicted includes the door angle 802, the acceleration 804 in the x-direction ($A_x$), the acceleration 806 in the y-direction ($A_y$), and the acceleration 808 in the z-direction ($A_z$). It should be appreciated that, in the illustrative embodiment, the acceleration 808 in the z-direction will typically include the least amount of information, because the door should not move much (if any) vertically during normal operation. As such, in some embodiments, the acceleration 808 may be used to determine the noise of the sensor(s), which may be used to calibrate the system for offset and/or drift errors. Additionally, the acceleration 808 may be leveraged to detect significant or extreme shock/vibration events and vertical motion events (e.g., a door being lifted above a risen threshold). Additionally, in the illustrative embodiment, the acceleration 804 in the x-direction is the tangential force. Based on the angular velocity (e.g., determined from the gyrometer(s) 322) and the tangential acceleration 808, the door device 102 can estimate the positioning on the door. Additionally, in some embodiments, the acceleration 808 may be utilized to verify one or more gyrometer measurements. In the illustrative embodiment, the acceleration 806 in the y-direction corresponds with motion on the face of the door, or the physical acceleration of the door, which may correlate to angular acceleration. As depicted in the graph 800, when the door begins its opening 810 phase during normal operation, the door gets to its maximum acceleration 812 and then its maximum speed 814. As the door approaches the fully open or hold-open position, the door begins to slow down 816 until the peak 818 of the door movement is reached. As the door closes 820, the sensor data typically does not reveal anything remarkable during normal operation until the door contacts the frame and latch 822.

Referring now to FIGS. 10-14, various graphs depicting sensor data associated with the operation of the door during various door fault states are shown. As described herein, the door device 102 may analyze the sensor data to determine the likelihood of various door faults and inform the maintenance technician of such likelihoods for more informed repair of the door device 102. It should be appreciated that the graphs depicted in FIGS. 10-19 are included to illustrate the various principles described herein and therefore the technologies described herein should not be limited to the door faults described in reference to those figures.

Figure 10:
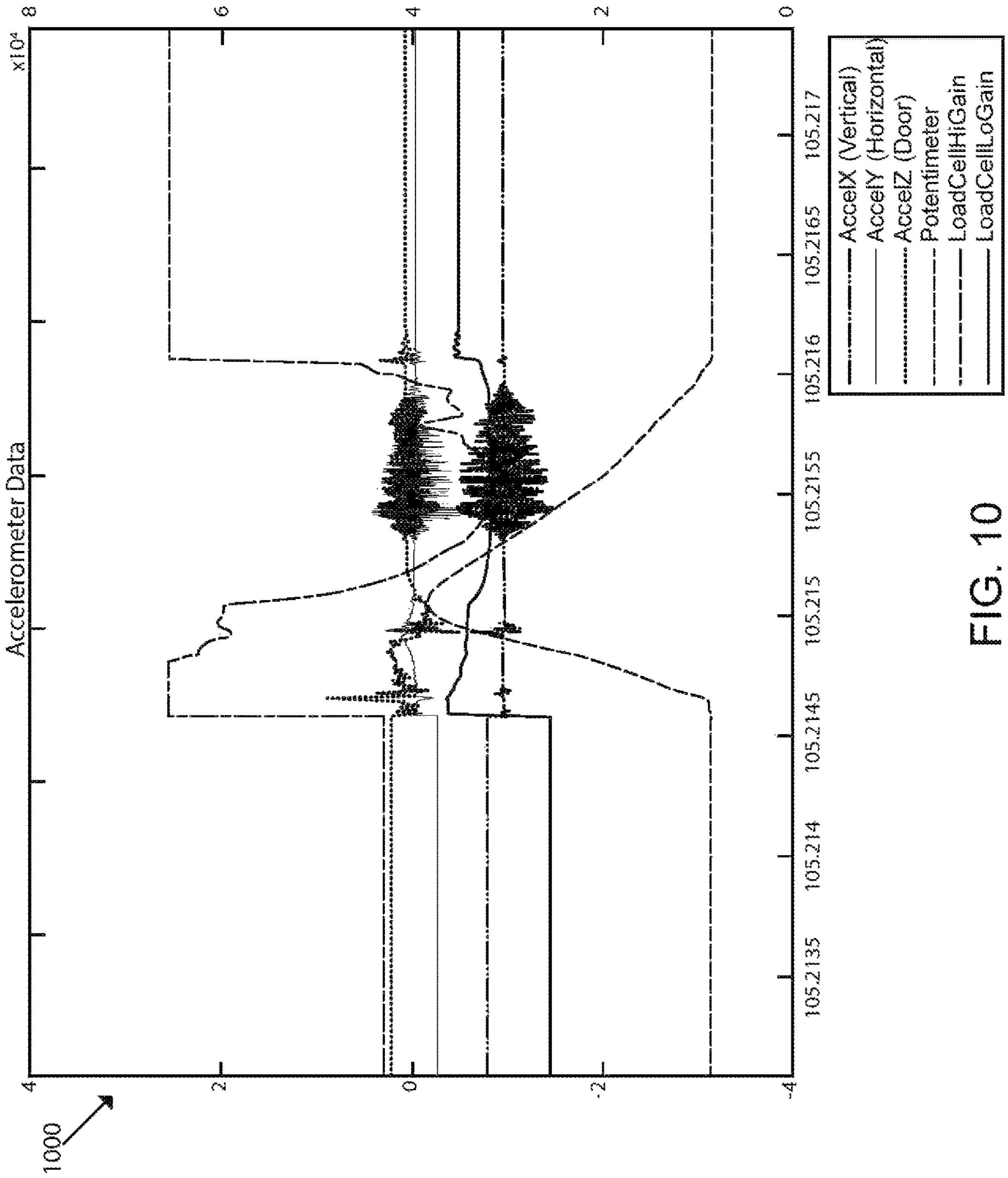
FIGS. 10-14 are graphs depicting sensor data associated with the operation of the door during various door fault states.
Figure 11:
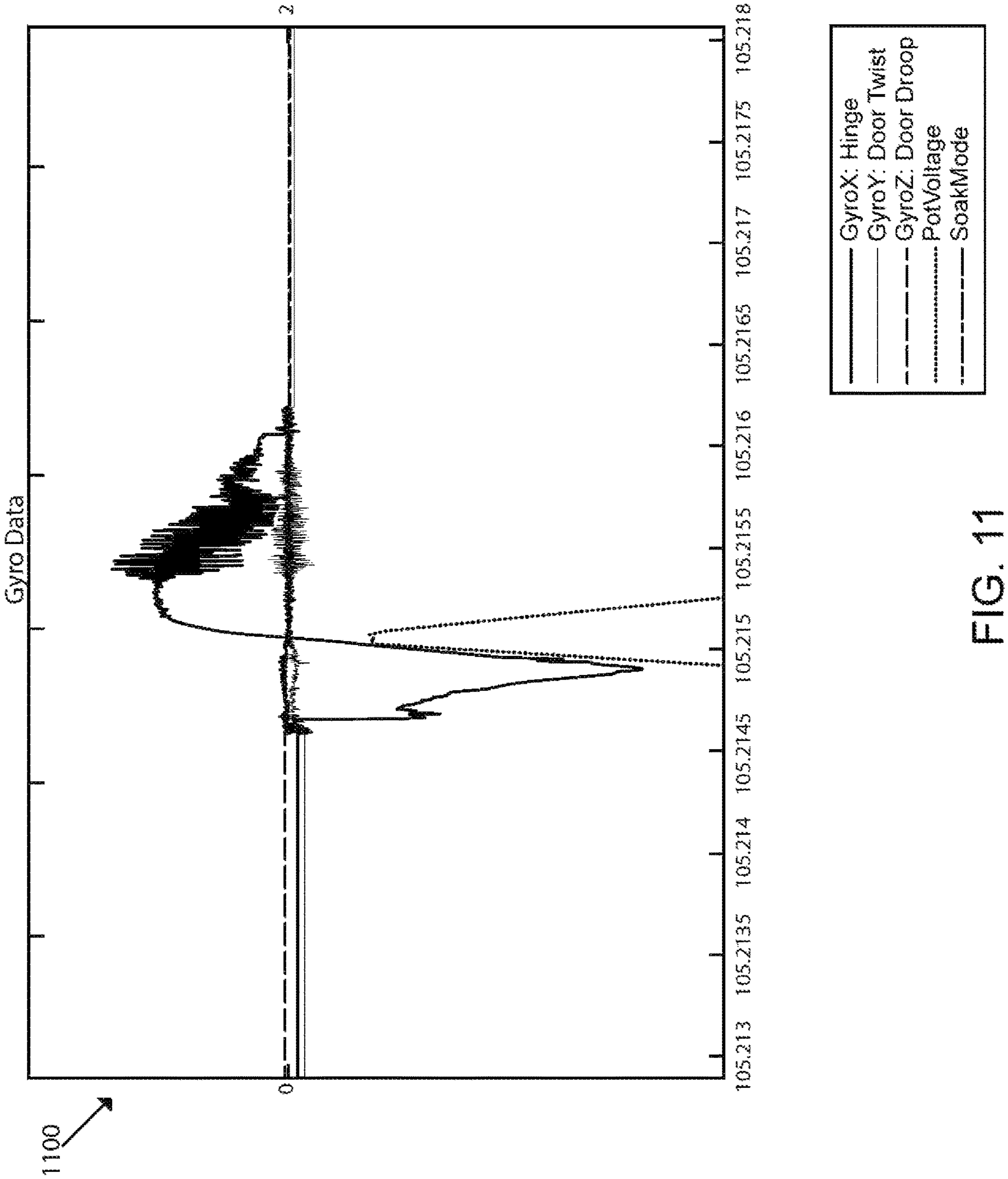
Figure 12:
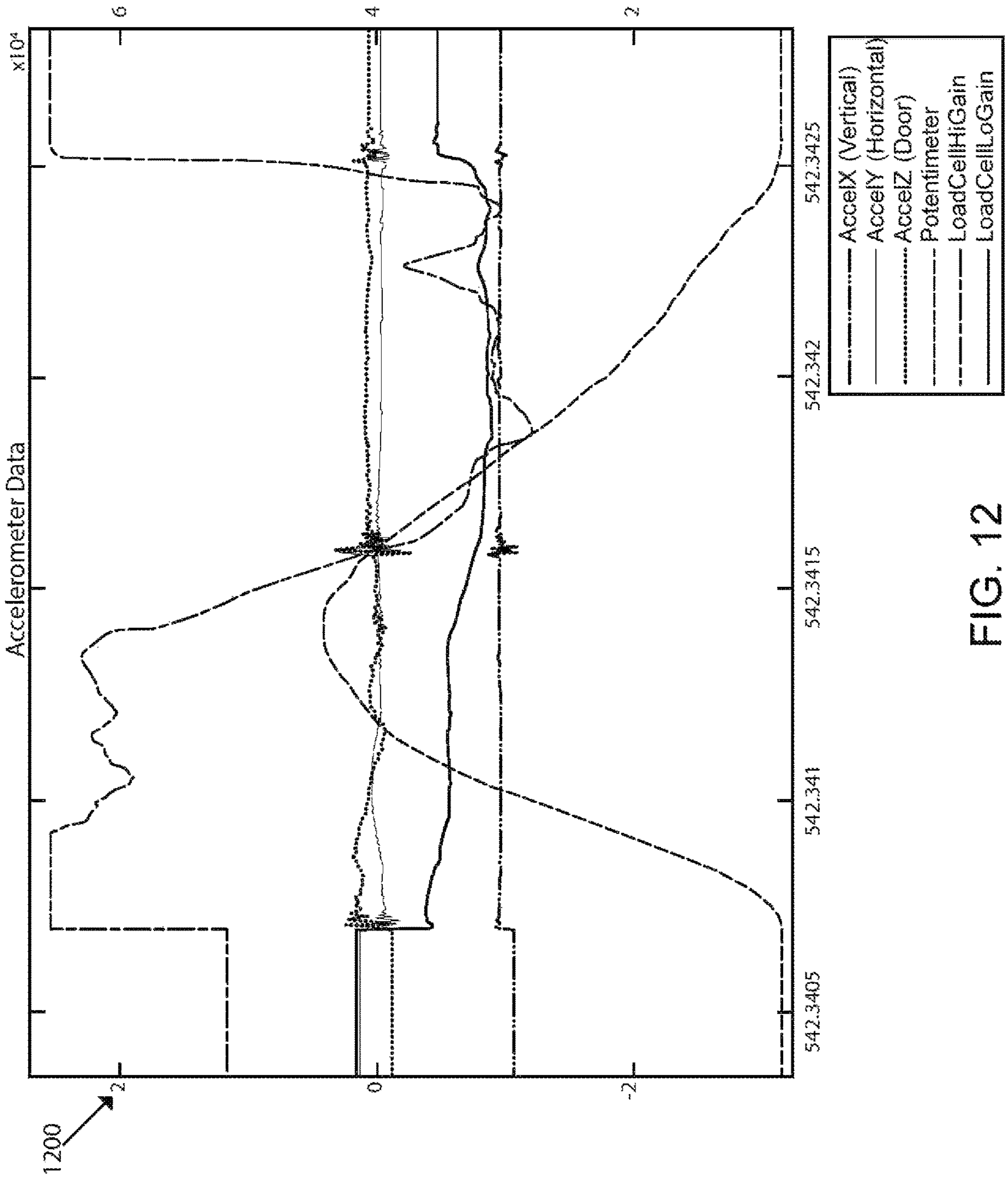

Referring to FIGS. 10-12, the graph 1000 of FIG. 10 depicts the sensed accelerations (e.g., via the accelerometer(s) 318) of the door device 102 in the x-direction, the y-direction, and the z-direction. Additionally, the graph 1000 depicts the door angle, which may be determined either directly or indirectly from the sensor data depending on the particular embodiment. As shown, the accelerometer data reveals significant multi-dimensional vibration of the door device 102 during the middle part of the door closing cycle. In some embodiments, such vibrations may indicate a significant amount of noise (e.g., a loud audible groan) during the closing cycle and may be a result of, for example, the door rubbing against the bottom threshold. Similarly, the graph 1100 of FIG. 11 depicts the various sensed orientations (e.g., via the gyrometer(s) 322) of door device 102, which reveals a similar vibration. Based on the analyzed sensor data using the techniques described herein, the door device 102 may inform the technician that rubbing against the bottom threshold has a high likelihood of being the root cause (e.g., a probable door fault). Accordingly, the technician may repair the threshold and reassess the operation via the sensor data as shown in the graph 1200 of FIG. 12. As shown, the significant vibration in the accelerations is gone, indicating that the repair was generally successful. However, there remains some minor vibration, which indicates that further analysis and fault prediction may be advised.

Figure 14:
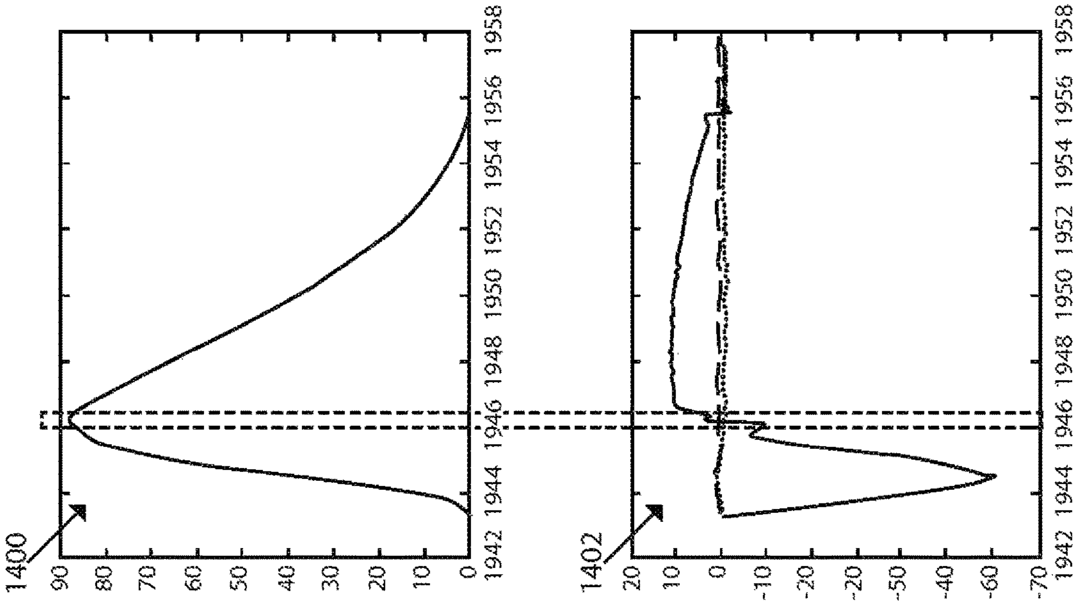
Figure 13:
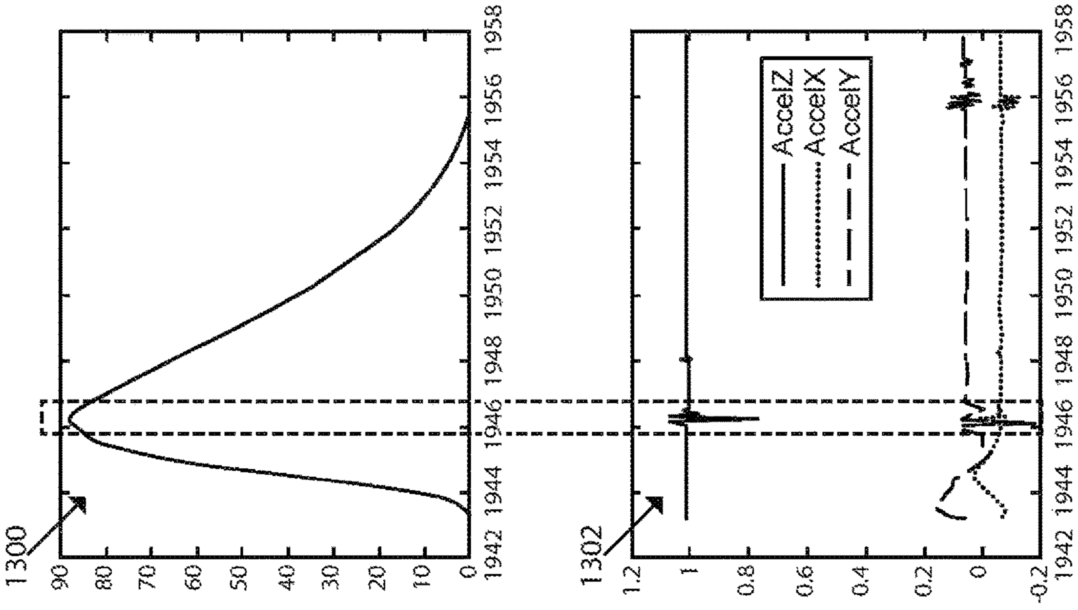

Referring now to FIGS. 13-14, the graphs 1300, 1302, 1400, 1402 depict various sensor data associated with a closer backcheck being set improperly. It should be appreciated that, when a door closer backcheck is set improperly, the door may collide with the backstop with a significant impact, which may cause wear to the door hardware (e.g., the hinges) and the door itself. In some embodiments, a symptom of such a condition may be an acceleration impact at a high or maximum door angle indicating a collision. As shown, the graphs 1300, 1400 depict the door angle, the graph 1302 depicts the three-dimensional accelerations sensed by the door device 102, and the graph 1402 depicts the three-dimensional orientations sensed by the door device 102. As described above, the acceleration along the z-axis should remain constant due to gravity, the acceleration along the x-axis is the tangential acceleration, and the acceleration along the y-axis is the door acceleration and deceleration. As shown, the graph 1302 depicts normal operation until a multi-dimensional acceleration spike occurs at the peak door angle. The door device 102 may analyze the sensor data to determine that the acceleration signal amplitude exceeds the expected signal value and thereby deduce that an object likely stopped the motion of the door. Further, because the signal spike has a relatively high-frequency, the door device 102 may deduce that a rigid body caused the door to stop moving. As such, considered collectively, the door device 102 may ascertain that the door hit an object such as a door stop. In other words, it should be appreciated that the door device 102 may indicate a relatively high likelihood that contact with the door stop is the root door fault. The gyrometer data depicted in the graph 1402 further suggests that the backcheck did activate; however, the rate of change of the signal indicates that the velocity changed dramatically, which is likely due to a collision with a rigid body. Further, the upward slope of the signal indicates that something continued to push the door (i.e., moving it faster) until the door hit the backstop. Due to the additionally noted force pushing the door, the door closer 102 may indicate that the fault may have been due to a user interacting with the door (e.g., to force the door to 90 degrees or beyond) rather than improper door closer operation.

Figure 15:
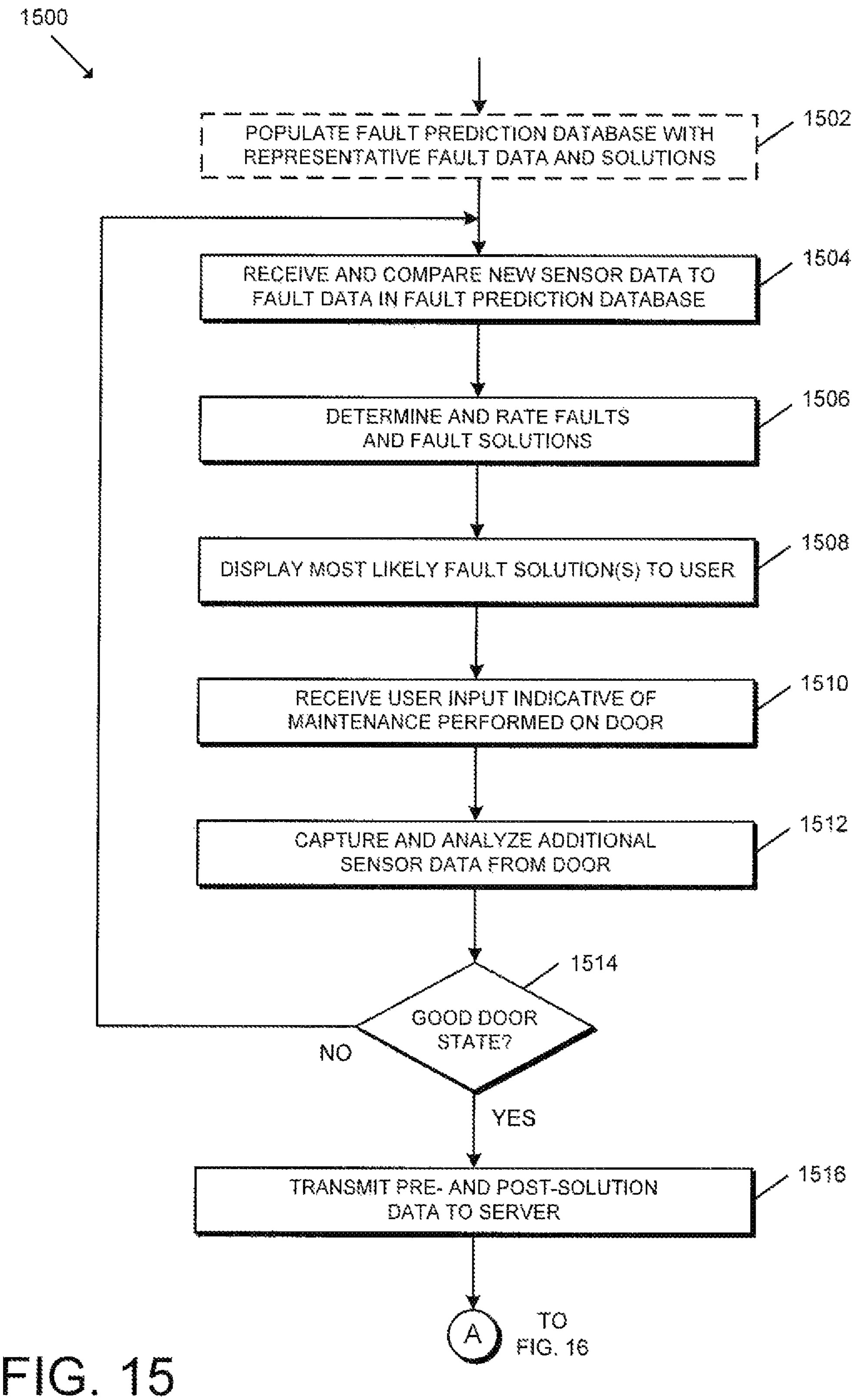
FIGS. 15-16 are a simplified flow diagram of at least one embodiment of a method for updating a fault prediction database and associated algorithm.
Figure 16:
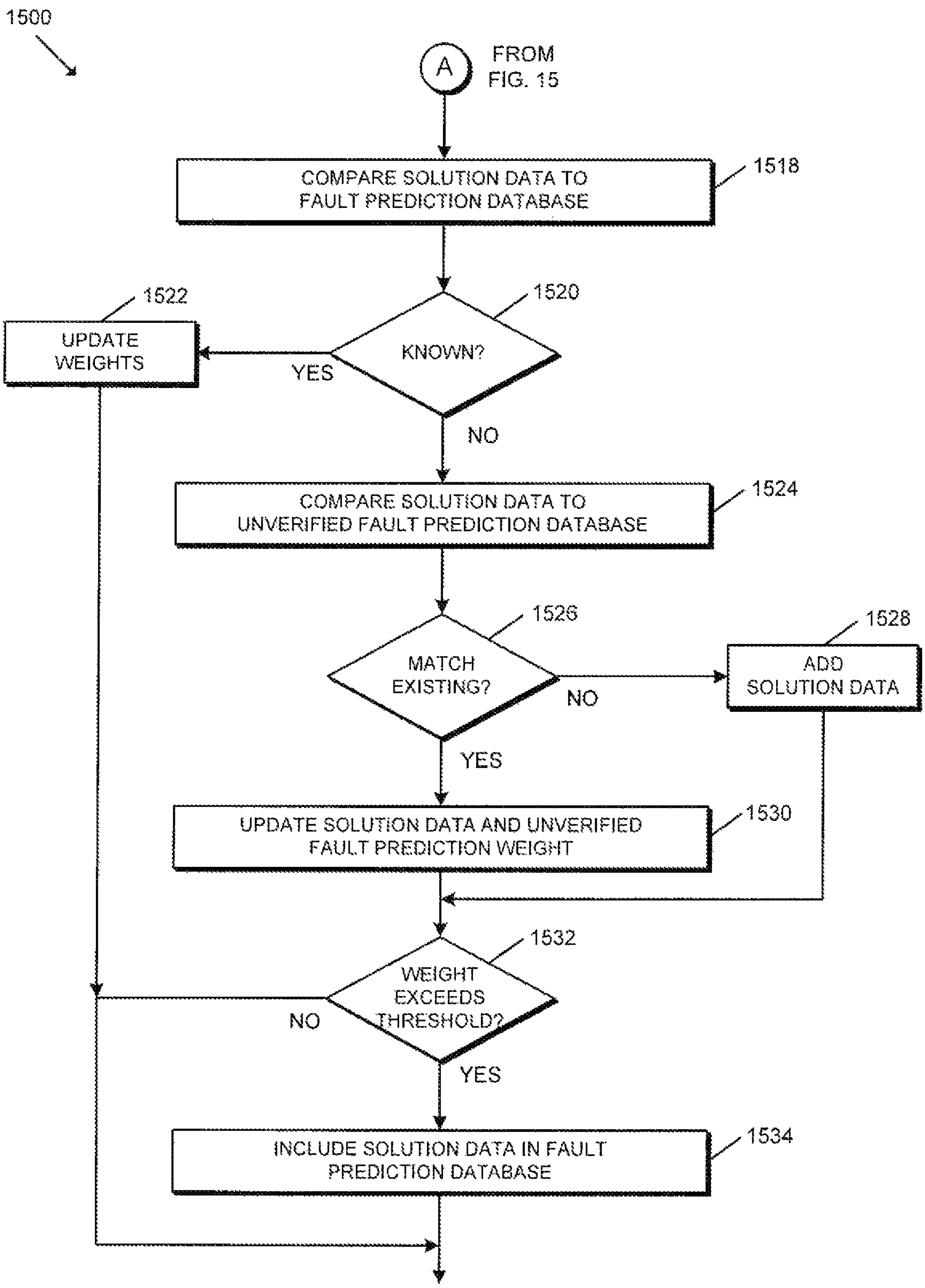

Referring now to FIGS. 15-16, in use, the system 100 may execute a method 1500 for updating a fault prediction database and associated algorithm. As described above, depending on the particular embodiment, each of the blocks of the method 1500 may be executed by the door device 102 and/or the server 104. However, for brevity of the description, the method 1500 is described herein as being jointly executed by the door device 102 and the server 104. It should be appreciated that the particular blocks of the method 1500 are illustrated by way of example, and such blocks may be combined or divided, added or removed, and/or reordered in whole or in part depending on the particular embodiment, unless stated to the contrary.

The illustrative method 1500 begins with block 1502 in which the server 104 may populate the fault prediction database with representative fault data and fault solutions. It should be appreciated that the representative fault data may include various weights 214 associated with a machine learning algorithm (e.g., an artificial neural network 212). As described above, the fault prediction database includes fault data that is representative of various prospective faults or fault conditions and configured to be compared (directly or indirectly) with sensor data generated by the door device 102 during operation of the door. Accordingly, in block 1504, the door device 102 receives and compares the "new" sensor data (e.g., received from the door device 102) to the representative fault data stored in the fault prediction database as described above. In block 1506, the door device 102 determines and rates the faults and fault solutions. For example, as described above, in some embodiments, the representative fault data may be compared to the door behavior data to determine whether the corresponding fault is likely based on the underlying sensor data. In some embodiments, each of the faults in the fault prediction database may identify a corresponding fault solution to resolve the fault.

In block 1508, the door device 102 displays the most likely fault solution(s) to the user/technician. For example, in some embodiments, the door device 102 may display the fault solutions to the user via the interface device 108. In other embodiments, the door device 102 may transmit the fault solutions to the mobile device 106 for display to the user. In yet other embodiments, the door device 102 may display the fault solutions locally via the indicator(s) 314 of the door device 102. In block 1510, the door device 102 receives user input (e.g., from the technician) indicating the maintenance performed on the door. It should be appreciated that maintenance performed may or may not be the maintenance recommended depending on the particular circumstances. For example, in some embodiments, the technician may ignore the recommendations of the door device 102.

In block 1512, after the maintenance has been performed, the door device 102 captures and analyzes additional sensor data associated with the operation of the door based on the techniques described above to determine whether there are any further faults associated with the door operation. As described above, it should be appreciated that the analysis may be performed on the door device 102 or the server 104 depending on the particular embodiment. In block 1514, the door device 102 determines whether the operation of the door is in a good state (e.g., operating normally and/or satisfactorily). If not, the method 1500 returns to block 1504 in which the door device 102 again compares the sensor data to the fault data stored in the fault prediction database to determine the most likely door fault(s). Otherwise, the method 1500 advances to block 1516 in which the door device 102 transmits the pre-solution data and the post-solution data to the server 104. For example, the pre-solution and post-solution data may include the raw sensor data and/or the filtered, analyzed, and/or otherwise processed sensor data. Further, in some embodiments, the pre-solution and post-solution data may include the various likelihoods, behavioral data, the maintenance performed, and/or other data described herein.

In block 1518 of FIG. 16, the server 104 compares the solution data to the fault prediction database to determine whether the fault prediction already associates the identified likely fault with the maintenance performed. If the server 104 determines in block 1520 that the combination is already known, the method 1500 advances to block 1522 in which the server 104 updates the fault prediction database with the appropriate weights 214. For example, as described above, the weights 214 of the various faults and/or solutions may be associated with an artificial neural network 212 or other machine learning algorithm. If the combination is not known, the method 1500 advances to block 1524 in which the server 104 compares the solution data to an unverified (e.g., premature) fault prediction database. In other words, in some embodiments, the system 100 may include an unverified fault prediction database that includes fault data and corresponding solutions that are possible matches but not yet confirmed to the extent necessary to confidently suggest those solutions for the corresponding faults.

In block 1526, the server 104 determines whether the fault/solution combination matches an existing combination identified in the unverified fault prediction database. If not, the method 1500 advances to block 1528 in which the server 104 adds the fault/solution combination to the unverified fault prediction database. Otherwise, the method 1500 advances to block 1530 in which the server 104 updates the solution data and the unverified fault prediction weight/score. In block 1532, the server 104 determines whether the weight/score of the unverified fault prediction combination exceeds a predetermined threshold. If so, in block 1534, the server 104 moves the solution data (e.g., the fault/solution combination) from the unverified fault prediction database to the standard fault prediction database from which solutions are drawn for user recommendations.

Although the blocks 1502-1534 are described in a relatively serial manner, it should be appreciated that various blocks of the method 1500 may be performed in parallel in some embodiments.

What is claimed is:

1. An auto-operator, comprising:

a plurality of sensors configured to generate sensor data associated with one or more characteristics of a door;

at least one processor; and at least one memory comprising a plurality of instructions stored thereon that, in response to execution by the at least one processor, causes the auto-operator to:

receive the sensor data from the plurality of sensors;

analyze the sensor data to determine behavior data indicative of a behavior of the auto-operator; and compare the behavior data to a plurality of representative data associated with a plurality of door faults to determine a corresponding likelihood that the sensor data corresponds with each of the door faults;

wherein the at least one memory further comprising an artificial neural network and corresponding weights, and wherein the plurality of instructions further causes the auto-operator to:

receive input indicative of maintenance performed on the door;

receive new sensor data from the plurality of sensors in response to receipt of the input indicative of the maintenance performed;

analyze the new sensor data to determine new behavior data indicative of the behavior of the auto-operator;

compare the new behavior data to the plurality of representative data associated with the plurality of door faults to determine a new corresponding likelihood that the new sensor data corresponds with each of the door faults based on the artificial neural network and the corresponding weights; and update the weights of the artificial neural network based on the maintenance performed and the comparison of the new behavior data to the plurality of representative data, wherein each of the weights is associated with a corresponding door fault.

2. The auto-operator of claim 1, wherein the at least one memory comprises a fault prediction database that includes the data associated with door faults and the corresponding weights of the artificial neural network;

wherein the plurality of instructions further causes the auto-operator to determine whether the fault prediction database associates the maintenance performed on the door as a solution for a likely fault associated with the new sensor data; and wherein to update the corresponding weights of the artificial neural network in the fault prediction database comprises to update the corresponding weights in response to a determination that the fault prediction database already associates the maintenance performed on the door as a solution for the likely fault associated with the new sensor data.

3. The auto-operator of claim 2, wherein the plurality of instructions further causes the auto-operator to:

compare the maintenance performed on the door to an unverified fault prediction database of unverified solutions; and update the corresponding weights of the artificial neural network in the unverified fault prediction database in response to a match for the maintenance performed in the unverified fault prediction database;

wherein possible solutions to faults in the unverified fault prediction database are presented as possible solutions only if an associated weight of the possible solution exceeds a predetermined threshold.

4. The auto-operator of claim 1, further comprising a primary housing that includes the at least one processor and the at least one memory; and wherein at least one of the plurality of sensors is located external to the primary housing.

5. The auto-operator of claim 1, wherein a first sensor of the plurality of sensors is configured to detect a force on the door and wake other sensors of the plurality of sensors in response to detection of the force on the door.

6. The auto-operator of claim 1, wherein to compare the behavior data to the plurality of representative data associated with the plurality of door faults comprises to segment the behavior data into a plurality of operating regions, wherein each operating region of the plurality of operating regions is associated with a corresponding predefined door zone, and wherein each corresponding predefined door zone is associated with a range of door angles relative to a closed position of the door.

7. The auto-operator of claim 6, wherein to segment the behavior data into the plurality of operating regions comprises to segment the behavior data into at least a first operating region associated with an opening zone, a second operating region associated with a hold-open zone, and a third operating region associated with a closing zone.

8. The auto-operator of claim 6, wherein to segment the behavior data into the plurality of operating regions comprises to segment the behavior data into a first operating region associated with an initial opening zone, a second operating region associated with a latch zone during opening, a third operating region associated with a main zone during opening, a fourth operating region associated with a hold-open zone, a fifth operating region associated with a main zone during closing, a sixth operating region associated with a latch zone during closing, a seventh operating region associated with a frame zone during closing, an eighth operating region associated with a closed position, and a ninth operating region associated with a resting position.

9. The auto-operator of claim 6, wherein to compare the behavior data to the plurality of representative data associated with the plurality of door faults comprises to:

select a first feature;

select a first operating region from the plurality of operating regions; and perform feature detection to the behavior data within the first operating region to generate a first feature detection score based on the first feature.

10. The auto-operator of claim 9, wherein to compare the behavior data to the plurality of representative data associated with the plurality of door faults further comprises to:

select a second feature;

perform feature detection to the behavior data within the first operation region to generate a second feature detection score based on the second feature; and generate an operating region score based on the first feature detection score and the second feature detection score.

11. The auto-operator of claim 10, wherein to compare the behavior data to the plurality of representative data associated with the plurality of door faults further comprises to generate one or more system scores based on the operating region score and at least one other operating region score associated with a second operating region selected from the plurality of operating regions; and wherein each of the one or more system scores comprises an output value of the artificial neural network.

12. The auto-operator of claim 1, wherein the plurality of instructions further causes the auto-operator to:

detect, by a first sensor of the plurality of sensors, movement of the door; and transition other sensors of the plurality of sensors from a low power sleep state to a higher power state in response to detecting movement of the door.

13. The auto-operator of claim 1, wherein the plurality of sensors further comprises one or more environmental sensors adapted to generate sensor data indicative of a physical environment of the auto-operator;

wherein to analyze the sensor data comprises to (i) at least one of filter or synthesize the sensor data to determine one or more inertial measurements indicative of the behavior of the auto-operator, and (ii) determine an environmental context of the auto-operator based on the sensor data generated by the one or more environmental sensors; and wherein the behavior data is determined based on the one or more inertial measurements and the environmental context of the auto-operator.

14. A door fault identification system, comprising:

at least one processor; and at least one memory comprising data associated with door faults, an artificial neural network and corresponding weights of the artificial neural network, and a plurality of instructions stored thereon that, in response to execution by the at least one processor, causes the door fault identification system to:

receive sensor data from a plurality of sensors of an electronic lock associated with one or more characteristics of a door;

analyze the sensor data with the artificial neural network to determine behavior data indicative of a behavior of the electronic lock; and compare, with the artificial neural network, the behavior data to a plurality of representative data associated with a plurality of door faults to determine a corresponding likelihood that the sensor data corresponds with each of the door faults based on the artificial neural network;

wherein the plurality of instructions further causes the door fault identification system to:

receive input indicative of maintenance performed on the door;

receive new sensor data from the plurality of sensors in response to receipt of the input indicative of the maintenance performed;

analyze the new sensor data to determine new behavior data indicative of the behavior of the electronic lock;

compare the new behavior data to the plurality of representative data associated with the plurality of door faults to determine a new corresponding likelihood that the new sensor data corresponds with each of the door faults based on the artificial neural network; and update the weights of the artificial neural network based on the maintenance performed and the comparison of the new behavior data to the plurality of representative data, wherein each of the weights is associated with a corresponding door fault.

15. The door fault identification system of claim 14, wherein the at least one memory comprises a fault prediction database that includes the data associated with door faults and the weights of the artificial neural network;

wherein the plurality of instructions further causes the door fault identification system to determine whether the fault prediction database associates the maintenance performed on the door as a solution for a likely fault associated with the new sensor data; and wherein to update the weights of the artificial neural network in the fault prediction database comprises to update the weights in response to a determination that the fault prediction database already associates the maintenance performed on the door as a solution for the likely fault associated with the new sensor data.

16. The door fault identification system of claim 15, wherein the plurality of instructions further causes the door fault identification system to:

compare the maintenance performed on the door to an unverified fault prediction database of unverified solutions; and update weights of the artificial neural network in the unverified fault prediction database in response to a match for the maintenance performed in the unverified fault prediction database;

wherein possible solutions to faults in the unverified fault prediction database are presented as possible solutions only if an associated weight of the possible solution exceeds a predetermined threshold.

17. The door fault identification system of claim 14, wherein to compare the behavior data to the plurality of representative data associated with the plurality of door faults comprises to segment the behavior data into a plurality of operating regions, wherein each operating region of the plurality of operating regions is associated with a corresponding predefined door zone, and wherein each corresponding predefined door zone is associated with a range of door angles relative to a closed position of the door.

18. The door fault identification system of claim 17, wherein to segment the behavior data into the plurality of operating regions comprises to segment the behavior data into a first operating region associated with an initial opening zone, a second operating region associated with a latch zone during opening, a third operating region associated with a main zone during opening, a fourth operating region associated with a hold-open zone, a fifth operating region associated with a main zone during closing, a sixth operating region associated with a latch zone during closing, a seventh operating region associated with a frame zone during closing, an eighth operating region associated with a closed position, and a ninth operating region associated with a resting position.

19. The door fault identification system of claim 17, wherein to compare the behavior data to the plurality of representative data associated with the plurality of door faults comprises to:

select a first feature;

select a first operating region from the plurality of operating regions;

perform feature detection to the behavior data within the first operating region to generate a first feature detection score based on the first feature;

select a second feature;

perform feature detection to the behavior data within the first operation region to generate a second feature detection score based on the second feature;

generate an operating region score based on the first feature detection score and the second feature detection score;

generate one or more system scores based on the operating region score and at least one other operating region score associated with a second operating region selected from the plurality of operating regions; and wherein each of the one or more system scores comprises an output value of the artificial neural network.

20. The door fault identification system of claim 14, wherein the plurality of instructions further causes the door fault identification system to:

detect, by a first sensor of a plurality of sensors of the electronic lock, movement of the door; and transition other sensors of the plurality of sensors of the electronic lock from a low power sleep state to a higher power state in response to detecting movement of the door.

21. An auto-operator, comprising:

a plurality of sensors configured to generate sensor data associated with one or more characteristics of a door;

at least one processor; and at least one memory comprising data associated with door faults, an artificial neural network and corresponding weights of the artificial neural network, and a plurality of instructions stored thereon that, in response to execution by the at least one processor, causes the auto-operator to:

receive the sensor data from the plurality of sensors;

analyze the sensor data to determine behavior data indicative of a behavior of the auto-operator; and compare the behavior data to a plurality of representative data associated with a plurality of door faults to determine a corresponding likelihood that the sensor data corresponds with each of the door faults based on the artificial neural network;

wherein the plurality of instructions further causes the auto-operator to:

receive input indicative of maintenance performed on the door;

receive new sensor data from the plurality of sensors in response to receipt of the input indicative of the maintenance performed;

analyze the new sensor data to determine new behavior data indicative of the behavior of the auto-operator;

compare the new behavior data to the plurality of representative data associated with the plurality of door faults to determine a new corresponding likelihood that the new sensor data corresponds with each of the door faults based on the artificial neural network; and update the weights of the artificial neural network based on the maintenance performed and the comparison of the new behavior data to the plurality of representative data, wherein each of the weights is associated with a corresponding door fault.

22. The auto-operator of claim 21, wherein the at least one memory comprises a fault prediction database that includes the data associated with door faults and the weights of the artificial neural network;

wherein the plurality of instructions further causes the auto-operator to determine whether the fault prediction database associates the maintenance performed on the door as a solution for a likely fault associated with the new sensor data; and wherein to update the weights of the artificial neural network in the fault prediction database comprises to update the weights in response to a determination that the fault prediction database already associates the maintenance performed on the door as a solution for the likely fault associated with the new sensor data.

23. The auto-operator of claim 22, wherein the plurality of instructions further causes the auto-operator to:

compare the maintenance performed on the door to an unverified fault prediction database of unverified solutions; and update weights of the artificial neural network in the unverified fault prediction database in response to a match for the maintenance performed in the unverified fault prediction database;

wherein possible solutions to faults in the unverified fault prediction database are presented as possible solutions only if an associated weight of the possible solution exceeds a predetermined threshold.

* * * * *